(12) United States Patent
Inoue et al.

(10) Patent No.: US 7,437,296 B2
(45) Date of Patent: Oct. 14, 2008

(54) SPEECH RECOGNITION DICTIONARY CREATION APPARATUS AND INFORMATION SEARCH APPARATUS

(75) Inventors: Tsuyoshi Inoue, Hirakata (JP); Makoto Nishizaki, Nerima-ku (JP); Tomohiro Konuma, Kawaguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1011 days.

(21) Appl. No.: 10/796,037

(22) Filed: Mar. 10, 2004

(65) Prior Publication Data

US 2004/0181391 A1 Sep. 16, 2004

(30) Foreign Application Priority Data

Mar. 13, 2003 (JP) ............................. 2003-068049

(51) Int. Cl.
*G10L 15/00* (2006.01)

(52) U.S. Cl. ..................... 704/275; 704/270; 348/114; 348/734; 715/727

(58) Field of Classification Search ................ 704/270, 704/275; 348/114, 734; 715/727
See application file for complete search history.

(56) References Cited

U.S. PATENT DOCUMENTS

| | | | | |
|---|---|---|---|---|
| 5,247,580 A | * | 9/1993 | Kimura et al. .............. | 704/275 |
| 5,774,859 A | * | 6/1998 | Houser et al. ............... | 704/275 |
| 6,075,575 A | * | 6/2000 | Schein et al. ............... | 348/734 |
| 6,223,307 B1 | * | 4/2001 | Mastrangelo et al. ......... | 714/38 |
| 6,763,332 B1 | * | 7/2004 | Fujii ........................... | 704/275 |
| 2006/0259299 A1 | * | 11/2006 | Kato et al. ................... | 704/231 |

FOREIGN PATENT DOCUMENTS

JP 2001-22374 1/2001

* cited by examiner

*Primary Examiner*—Daniel D Abebe
(74) *Attorney, Agent, or Firm*—Wenderoth, Lind & Ponack, L.L.P.

(57) ABSTRACT

A program guidance apparatus includes a recognition word storage unit (105) operable to store a past recognition word that is recognized by speech recognition in the past, a viewing history word storage unit (106) operable to store viewing history words that are the information of a viewed program and a dictionary creating unit (103) operable to create a customized recognition dictionary that is created by adding the past recognition word and viewing history words that are not included in the basic recognition dictionary to the basic recognition dictionary and another customized recognition dictionary to which weights are assigned using "item weight coefficient" according to the categories of words and "history weight coefficient" according to whether or not the word is recorded as a past recognition word or viewing history words.

35 Claims, 28 Drawing Sheets

FIG. 3

| Characters | Pronunciation | Category | Speech recognition date and time(update) | Frequency |
|---|---|---|---|---|
| 9時 | kuji | 日時(date) | 2004/1/10/8:30 | 2 |
| 3チャン | sanchan | 放送局(broadcasting station) | 2004/1/10/20:30 | 5 |
| ニュース | njūsu | ジャンル(genre) | 2004/1/9/17:30 | 10 |
| スポーツ | supōtsu | ジャンル(genre) | 2004/1/9/17:35 | 8 |
| 唐沢俊之 | karasawa toshiyuki | 出演者(cast) | 2004/1/8/19:50 | 3 |
| 藤原紀子 | fujiwara noriko | 出演者(cast) | 2004/1/2/8:30 | 2 |
| プロジェクトY | purojekuto wai | 番組名/ニュース(program name/news) | 2004/1/3/20:30 | 1 |

FIG. 4

| Characters | Viewing date and time(update) | Category | Frequency |
|---|---|---|---|
| ぬさまけTV | 2004/1/10/6:30 | 番組名/ニュース(program name/news) | 10 |
| ニュース34 | 2004/1/9/20:00 | 番組名/ニュース(program name/news) | 5 |
| まるごとスポーツ | 2004/1/8/23:00 | 番組名/スポーツ(program name/sports) | 1 |
| 青い巨塔 | 2004/1/8/21:00 | 番組名/ドラマ(program name/drama) | 3 |
| ユー・セント・メール | 2004/1/2/21:00 | 番組名/ドラマ(program name/drama) | 1 |
| 唐沢俊之 | 2004/1/8/6:30 | 出演者(cast) | 20 |
| ミグ・ライアン | 2004/1/8/21:00 | 出演者(cast) | 1 |
| 木村達也 | 2004/1/2/21:00 | 出演者(cast) | 2 |

FIG. 5

| Characters | Pronunciation | Category |
|---|---|---|
| 明日 | ashita | 日時(date) |
| 9時 | kuji | 日時(date) |
| | | |
| NNK | enuenukei | 放送局(broadcasting station) |
| 3チャン | sanchan | 放送局(broadcasting station) |
| | | |
| ドラマ | dorama | ジャンル(genre) |
| ニュース | njūsu | ジャンル(genre) |
| スポーツ | supōtsu | ジャンル(genre) |
| | | |
| めざましTV | mezamashi tii vii | 番組名/ニュース(program name/news) |
| 青い巨塔 | aoi kyotou | 番組名/ドラマ(program name/drama) |
| まるごとスポーツ | marugoto supōtsu | 番組名/スポーツ(program name/sports) |
| 京都の旅 | kyōto no tabi | 番組名/趣味(program name/hobby) |
| ニュース一番 | njūsu ichiban | 番組名/ニュース(program name/news) |
| スポーツ天国 | supōtsu tengoku | 番組名/スポーツ(program name/sports) |
| イタリアン・キス | itarian kisu | 番組名/映画(program name/movie) |
| | | |
| 唐沢俊之 | karasawa toshiyuki | 出演者(cast) |
| 米倉京子 | yonekura kyoko | 出演者(cast) |
| ミグ・ライアン | migu raian | 出演者(cast) |
| 松嶋奈津子 | matsushima natsuko | 出演者(cast) |

FIG. 6

| Characters | Pronunciation | Category |
|---|---|---|
| 明日 | ashita | 日時(date) |
| 9時 | kuji | 日時(date) |
| NNK | enuenukei | 放送局(broadcasting station) |
| 3チャン | sanchan | 放送局(broadcasting station) |
| ドラマ | dorama | ジャンル(genre) |
| ニュース | njūsu | ジャンル(genre) |
| スポーツ | supōtsu | ジャンル(genre) |
| めざましTV | mezamashi tii vii | 番組名/ニュース(program/news) |
| 青い巨塔 | aoi kyotou | 番組名/ドラマ(program/drama) |
| まるごとスポーツ | marugoto supōtsu | 番組名/スポーツ(program/sports) |
| 京都の旅 | kyōto no tabi | 番組名/趣味(program/hobby) |
| ニュース一番 | njusu ichiban | 番組名/ニュース(program/news) |
| スポーツ天国 | supōtsu tengoku | 番組名/スポーツ(program/sports) |
| イタリアン・キス | itarian kisu | 番組名/映画(program/movie) |
| 唐沢俊之 | karasawa toshiyuki | 出演者(cast) |
| 米倉京子 | yonekura kyoko | 出演者(cast) |
| ミグ・ライアン | migu raian | 出演者(cast) |
| 松嶋奈津子 | matsushima natsuko | 出演者(cast) |
| ---Addition from viewing history(not included in update)--- | | |
| ニュース34 | njūsu suriifō | 番組名/ニュース(program name/news) |
| 木村達也 | kimura tatsuya | 出演者(cast) |
| ユー・セント・メール | yu sento meiru | 番組名/映画(program name/movie) |
| ---Addition from speech recognition history(not included in update)--- | | |
| 藤原紀子 | fujiwara noriko | 出演者(cast) |
| プロジェクトY | purojekuto wai | 番組名/ニュース(program name/news) |

FIG. 7

| Key word category | Speech condition 1 | Speech condition 2 |
|---|---|---|
| program name | 8.6% | 26.7% |
| date and time | 23.8% | 26.7% |
| broadcasting station ch | 4.8% | 0.8% |
| genre | 44.8% | 23.3% |
| cast | 5.7% | 10.0% |
| program contents | 9.5% | 8.3% |
| others | 2.8% | 4.2% |

FIG. 8

| Characters | Pronunciation | Category | Item weight coefficient | History weight coefficient |
|---|---|---|---|---|
| 明日 | ashita | 日時(date) | 1.27 | 1.0 |
| 9時 | kuji | 日時(date) | 1.27 | 1.2 |
| NNK | enuenukei | 放送局(broadcasting station) | 1.06 | 1.0 |
| 3チャン | sanchan | 放送局(broadcasting station) | 1.06 | 1.2 |
| ドラマ | dorama | ジャンル(genre) | 1.49 | 1.1 |
| ニュース | njūsu | ジャンル(genre) | 1.49 | 1.3 |
| スポーツ | supōtsu | ジャンル(genre) | 1.49 | 1.2 |
| めざましTV | mezamashi tii vii | 番組名/ニュース(program/news) | 1.11 | 1.1 |
| 青い巨塔 | aoi kyotou | 番組名/ドラマ(program/drama) | 1.11 | 1.1 |
| まるごとスポーツ | marugoto supōtsu | 番組名/スポーツ(program/sports) | 1.11 | 1.1 |
| 京都の旅 | kyōto no tabi | 番組名/趣味(program/hobby) | 1.11 | 1.0 |
| ニュース一番 | njūsu ichiban | 番組名/ニュース(program/news) | 1.11 | 1.0 |
| スポーツ天国 | supōtsu tengoku | 番組名/スポーツ(program/sports) | 1.11 | 1.0 |
| イタリアンキス | itarian kisu | 番組名/映画(program/movie) | 1.11 | 1.0 |
| 唐沢俊之 | karasawa toshiyuki | 出演者(cast) | 1.07 | 1.3 |
| 米倉京子 | yonekura kyoko | 出演者(cast) | 1.07 | 1.0 |
| ミグ・ライアン | migu raian | 出演者(cast) | 1.07 | 1.1 |
| 松嶋奈津子 | matsushima natsuko | 出演者(cast) | 1.07 | 1.0 |
| --Addition from viewing history(not included in update)-- | | | | |
| ニュース34 | njūsu suriifō | 番組名/ニュース(program name/news) | 1.11 | 1.1 |
| 木村達也 | kimura tatsuya | 出演者(cast) | 1.07 | 1.1 |
| ユー・セント・メール | yu sento meiru | 番組名/映画(program name/movie) | 1.11 | 1.1 |
| --Addition from speech recognition history(not included in update)-- | | | | |
| 藤原紀子 | fujiwara noriko | 出演者(cast) | 1.07 | 1.2 |
| プロジェクトY | purojekuto wai | 番組名/ニュース(program name/news) | 1.11 | 1.2 |

FIG. 10

| Service ID:10103 | Starting date:December 17th, 2001 | | | | |
|---|---|---|---|---|---|
| EventID | Starting date | Starting time | Duration | Event name | text | genre |
| 0x8636 | 0 | 19:00:02 | 0:34:58 | News A<br>Is Mr. Z still in the cave? | [Caster] announcer B | News(fixed time/ all-around) |
| 0x8638 | 0 | 19:35:00 | 2:00:00 | スーパーライブ 2001 | Artists who admire artist N gather to sing a variety of songs with a wish for peace | music (domestic rock/ pops)<br>music(overseas rock/ pops)<br>music(live concert) |

FIG. 13A

| スポーツ | supōtsu | genre | | 1.49 | 1.3 |
| まるごとスポーツ | marugoto supōtsu | program name/sports | | 1.11 | 1.1 |
| スポーツ天国 | supōtsu tengoku | program name/sports | | 1.11 | 1.0 |

FIG. 13B

| recognition result example(score): | recognition result example(score): |
|---|---|
| 1. スポーツ天国(500)×1.11×1.0<br>2. スポーツ(300)×1.49×1.3<br>3.まるごとスポーツ(200)×1.11×1.1<br>. . | 1. スポーツ(581)<br>2. スポーツ天国(555)<br>3.まるごとスポーツ(242)<br>. . |

FIG. 14

| Characters | Pronunciation | Category |
|---|---|---|
| 明日 | ashita | 日時(date) |
| 9時 | kuji | 日時(date) |
| NNK | enuenukei | 放送局(broadcasting station) |
| 3チャン | sanchan | 放送局(broadcasting station) |
| ドラマ | dorama | ジャンル(genre) |
| ニュース | nyūsu | ジャンル(genre) |
| スポーツ | supōtsu | ジャンル(genre) |
| 唐沢俊之 | karasawa toshiyuki | 出演者(cast) |
| 米倉京子 | yonekura kyoko | 出演者(cast) |
| ミグ・ライアン | migu raian | 出演者(cast) |
| 松嶋奈津子 | matsushima natsuko | 出演者(cast) |

--- Addition from viewing history (not included in update) ---

| | | |
|---|---|---|
| 木村達也 | kimura tatsuya | 出演者(cast) |

--- Addition from speech recognition history (not included in update) ---

| | | |
|---|---|---|
| 藤原紀子 | fujiwara noriko | 出演者(cast) |

FIG. 16

| Characters | Recording date and time | Category | Reservation/storage |
|---|---|---|---|
| ニュース一番 | 2004/1/9/7:00 | program name/news | user |
| スポーツ天国 | 2004/1/7/23:00 | program name/sports | system |
| イタリアン・キス | 2004/1/6/21:00 | program name/movie | user |

FIG.17

| Characters | Pronunciation | Category | Item weight coefficient | History weight coefficient |
|---|---|---|---|---|
| 明日 | ashita | 日時(date) | 1.30 | 1.0 |
| 9時 | kuji | 日時(date) | 1.30 | 1.2 |
| NNK | enuenukei | 放送局(broadcasting station) | 1.03 | 1.0 |
| 3チャン | sanchan | 放送局(broadcasting station) | 1.03 | 1.2 |
| ドラマ | dorama | ジャンル(genre) | 1.25 | 1.1 |
| ニュース | njūsu | ジャンル(genre) | 1.25 | 1.3 |
| スポーツ | supōtsu | ジャンル(genre) | 1.25 | 1.2 |
| めざましTV | mezamashi tii vii | 番組名/ニュース(program/news) | 1.30 | 1.1 |
| 青い巨塔 | aoi kyotou | 番組名/ドラマ(program/drama) | 1.30 | 1.1 |
| まるごとスポーツ | marugoto supōtsu | 番組名/スポーツ(program/sports) | 1.30 | 1.1 |
| 京都の旅 | kyōto no tabi | 番組名/趣味(program/hobby) | 1.11 | 1.0 |
| ニュース一番 | njūsu ichiban | 番組名/ニュース(program/news) | 1.30 | 1.0 |
| スポーツ天国 | supōtsu tengoku | 番組名/スポーツ(program/sports) | 1.11 | 1.0 |
| イタリアンキス | itarian kisu | 番組名/映画(program/movie) | 1.30 | 1.0 |
| 唐沢俊之 | karasawa toshiyuki | 出演者(cast) | 1.12 | 1.3 |
| 米倉京子 | yonekura kyoko | 出演者(cast) | 1.12 | 1.0 |
| ミグ・ライアン | migu raian | 出演者(cast) | 1.12 | 1.1 |
| 松嶋奈津子 | matsushima natsuko | 出演者(cast) | 1.12 | 1.0 |
| —Addition from viewing history(not included in update)— | | | | |
| ニュース34 | njūsu surīfō | 番組名/ニュース(program name/news) | 1.30 | 1.1 |
| 木村達也 | kimura tatsuya | 出演者(cast) | 1.12 | 1.1 |
| ユー・セント・メール | yu sento meiru | 番組名/映画(program name/movie) | 1.30 | 1.1 |
| —Addition from speech recognition history(not included in update)— | | | | |
| 藤原紀子 | fujiwara noriko | 出演者(cast) | 1.12 | 1.2 |
| プロジェクトY | purojekuto wai | 番組名/ニュース(program name/news) | 1.11 | 1.2 |

FIG. 22

| Music title | Artist | Album | Genre | Details |
|---|---|---|---|---|
| BTW | Lettiri | BTW | Rock | 3:37 2004/1 on sale |
| Home Sweet | Motri | HSH | Rock | 4:20 1998/5 on sale |
| Cant' Stop | Bri | CSL | Pop | 4:10 2003/8 on sale |

FIG. 23

| Music title | Listening time period | Listening times | Storage source |
|---|---|---|---|
| BTW | 2004/1–2004/2 | 23 | CD |
| Home Sweet | 1998/6–2000/5 | 52 | CD |
| Cant' Stop | — | 0 | download/SUNY/automatic |

FIG. 24

|  | Weight coefficient | |
| --- | --- | --- |
|  | not-listened-to-music | listened-to-music |
| Music title | 1.1 | 1.3 |
| Artist | 1.2 | 1.3 |
| Album | 1.1 | 1.2 |
| genre | 1.3 | 1.3 |

FIG. 26

| Restaurant name | Genre 1 | Genre 2 | Main menu | Business hours |
|---|---|---|---|---|
| Pari hachi ku | Western | Itarian | pasta pizza | 11:00-21:00 |
| Tonkatsu tarō | Japanese | tonkatsu | tonkatsu | 11:00-20:00 |
| Gyokushō | Chinese | Chinese | rahmen/jiao-zi/chinese pilaf | 10:00-24:00 |

FIG. 27

| Restaurant name | Using time period | Using times | Using time zone |
|---|---|---|---|
| Pari hachi ku | — | — | — |
| Tonkatsu tarō | 2002/1–2004/1 | 4 | 19:00–21:00 |
| Gyokushō | 2000/5–2002/4 | 10 | 12:15–13:30, 20:00–24:00 |

FIG. 28

|  | Weight coefficient | |
|---|---|---|
|  | not-visited | visited |
| Restaurant name | 1.1 | 1.4 |
| Genre 1 | 1.4 | 1.3 |
| Genre 2 | 1.3 | 1.4 |
| Main menu | 1.3 | 1.2 |

SPEECH RECOGNITION DICTIONARY CREATION APPARATUS AND INFORMATION SEARCH APPARATUS

BACKGROUND OF THE INVENTION (1) Field of the Invention

The present invention relates to a speech recognition dictionary creation apparatus for creating a speech recognition dictionary that enables an information search apparatus such as a program guidance apparatus to perform speech recognition and the information search apparatus.

(2) Description of the Related Art

Recently, a conventional program guidance apparatus which includes a speech recognition dictionary creation apparatus has come in use with the increase in the number of program channels, and the conventional program guidance apparatus is for operating TV using an Electronic Program guide (EPG) and speech, receiving latest EPG data, creating a speech recognition dictionary corresponding to a program to be broadcast today or on a later date, and then deleting an old recognition dictionary so as not to use any extra hard resources.

Further, at the time of creating a dictionary, it classifies each of words into a certain category such as "program name", "genre", and "cast" in the EPG so as to register them in the dictionary and recognizes each of the words equally.

FIG. 1 is a block diagram showing the structure of the program guidance apparatus that has a conventional speech recognition dictionary creation apparatus.

The program guidance apparatus comprises an EPG receiving unit 701, an item classifying unit 702, a dictionary updating unit 703, a dictionary 704, a speech recognition unit 705, a clock 706, a registered word deleting unit 707, an EPG storage unit 708 and a control unit 709.

The EPG receiving unit 701 demultiplexes EPG data from a TV signal. The item classifying unit 702 demultiplexes EPG data such as "broadcasting time" that does not need for speech recognition and classifies the residual EPG data into a category such as "program title" and "cast". The dictionary updating unit 703 registers words included in the EPG data in a dictionary without duplication. The dictionary 704 records the words necessary for speech recognition along with its registration date and time. The speech recognition unit 705 refers to the dictionary 704 based on a speech signal by user speech and recognizes the specific words.

Also, the clock 706 outputs the present date and time to the registered word deleting unit 707. The registered word deleting unit 707 refers to the date and time of the clock 706 and deletes, for example, the words registered up to the previous day in all the words registered in the dictionary 704. The EPG storage unit 708 stores the EPG data demultiplexed in the EPG receiving unit 701. The control unit 709 searches the EPG data stored in the EPG storage unit 708 for the words recognized by the speech recognition unit 705 and outputs the corresponding program contents (for example, refer to FIG. 1 in page 7 of the Japanese Laid-Open Patent application No. 2001-22374).

The contents of recognition words in a dictionary changes because the conventional program guidance apparatus mentioned above creates a dictionary using latest EPG data, but its user rarely pays attention to the change.

Here, for example, in the case where a user performs a TV program search or TV operation using a program name that has been viewed by the user and has interested the user or a cast name that is not included in the latest EPG data, the program guidance apparatus outputs a word that has the highest recognition score in the dictionary as the recognition result. This is because any word that is not registered in the dictionary cannot be recognized. Therefore, the outputted recognition result may differ from the program name or the cast name that is expected by the user. In this case, the user is to think that this recognition result is an error and say the same words repeatedly.

Therefore, it is conceivable to use not only the latest EPG data but also past EPG data in creating a dictionary, but in this case, a large number of words must be registered in the dictionary.

Also, with the increase in the number of program channels, the number of the recognition words also increases. However, there is a problem that its recognition rate is decreasing because the conventional speech recognition dictionary creation apparatus searches only new data as words to be recognized.

SUMMARY OF THE INVENTION

Therefore, the present invention is conceived considering the above-mentioned situation, and an object of the present invention is to provide a speech recognition dictionary creation apparatus and an information search apparatus that are capable of improving the recognition rate, minimizing the increase in the number of words to be recognized.

In order to achieve the above-mentioned object, the speech recognition dictionary creation apparatus, of the present invention, for creating recognition dictionaries that are used for speech recognition comprising a dictionary creating unit operable to create a plurality of recognition dictionaries with different contents depending on presence/absence of user experience.

Here, the presence/absence of user experience is concerning presence/absence of viewing, and the dictionary creating unit may create the plurality of recognition dictionaries based on the presence/absence of the viewing.

Also, the presence/absence of user experience is concerning presence/absence of using, and the dictionary creating unit may create the plurality of recognition dictionaries based on the presence/absence of the using.

Also, the presence/absence of user experience is concerning presence/absence of visiting, and the dictionary creating unit may create the plurality of recognition dictionaries based on the presence/absence of the visiting.

In this way, a plurality of recognition dictionaries are created based on whether a user has already viewed the program or not, to be more specific, whether the user searches a program to be broadcast in the future or the user searches the program that the user has already viewed (or recorded) before. Therefore, it is possible to create recognition dictionaries with an improved speech recognition rate according to the purpose.

Also, the speech recognition dictionary creation apparatus further comprises: an action history word obtaining unit operable to obtain an action history word to be recognized based on an action of a user; an action history word storage unit operable to store the obtained action history word; a fixed word storage unit operable to store fixed words to be set previously; a word extracting unit operable to extract new recognition words to be recognized from inputted data; and a dictionary storage unit operable to store the plurality of created recognition dictionaries, wherein the dictionary creating unit may create one of the plurality of recognition dictionaries by selecting new registration words from the new recognition words, the fixed words and the action history word, registering the new registration words in the recognition dictionary and adding, to the new registration words, information indicating pronunciations and parts of speech of the new registration words.

Registering an action history word that is not included in the inputted data in this way makes it possible to create a recognition dictionary capable of avoiding an error of speech recognition.

Also, the speech recognition dictionary creation apparatus further comprises: a recognition word obtaining unit operable to obtain a past recognition word that was recognized by speech recognition; and a past recognition word storage unit operable to store the past recognition word, wherein the dictionary creating unit may create one of the plurality of recognition dictionaries by selecting new registration words from the new recognition words, the fixed words, the action history word and the past recognition word, registering the new registration words in the recognition dictionary and adding, to the new registration words, information indicating pronunciations and parts of speech of the new registration words.

Registering a past recognition word that is not included in the inputted data in this way makes it possible to create a recognition dictionary capable of avoiding an error of speech recognition.

In this way, registering only the word of an action history word or a past recognition word in addition to new words instead of all the words that are included in a certain time period in the past as the words to be recognized makes it possible to minimize the increase in the number of words to be recognized, minimize the deterioration of the speech recognition rate and to realize a speech recognition dictionary that requires fewer hard resources.

Also, the dictionary creating unit may create the recognition dictionary by assigning weights to each of the new registration words based on whether or not the words are included in the action history word and adding, to the new registration words, information concerning the assigned weights.

In this way, assigning weights to each of the new registration words based on whether each word is the word included in the action history word or not enables creating a recognition dictionary with an improved speech recognition rate.

Also, the dictionary creating unit may create the recognition dictionary by assigning weights to each of the new registration words based on whether or not the words are included in the past recognition word and adding, to the new registration words, information concerning the assigned weights.

In this way, assigning weights to each of the new registration words based on whether each word is the word included in the past recognition word or not enables creating a recognition dictionary with an improved speech recognition rate.

Also, the data to be inputted is structured data, the word extracting unit extracts attributes of the new recognition words together with the new recognition words, and the dictionary creating unit may create the recognition dictionary by assigning weights to each of the new registration words based on the attributes of the new recognition words and adding, to the new registration words, information concerning the assigned weights.

In this way, assigning weights to each of the new registration words based on the attribute of each new recognition word enables creating a recognition dictionary with an improved speech recognition rate.

Also, the speech recognition dictionary creation apparatus further comprises a user information obtaining unit operable to obtain user recognition information for identifying the user, wherein the dictionary creating unit may create the recognition dictionary for each piece of the user recognition information.

Also, the speech recognition dictionary creation apparatus further comprises a user information obtaining unit operable to obtain user recognition information for identifying a user, wherein the dictionary creating unit may create the recognition dictionary by assigning weights to each of the new registration words for each piece of the user recognition information.

In this way, it becomes possible to create a recognition dictionary customized for a plurality of users.

Also, the action history word obtaining unit records action date and time together with the action history word in the action history word storage unit, the dictionary creating unit may create the recognition dictionary by further adding the action date and time to some of new registration words, these new registration words being selected from the action history word, and the speech recognition dictionary creation apparatus further comprises a word deleting unit operable to delete, from the recognition dictionary, the registration words which have been stored for a predetermined time period starting from the action date and time of the registration words.

In this way, using a recognition dictionary with words that are not included in the data to be inputted makes it possible to reduce the number of hard resources of the speech recognition dictionary creation apparatus because speech recognition errors are reduced and further, each registered word is automatically deleted from the recognition dictionary after a predetermined time period passes.

Also, the information search apparatus, of the present invention, for creating recognition dictionaries that are used for speech recognition and searching information using a speech signal based on speech of a user, comprises: a dictionary creating unit operable to create a plurality of recognition dictionaries depending with different contents on presence/absence of user experience; a speech recognition unit operable to recognize a specific word from the speech signal by referring to one of the recognition dictionaries; a data storage unit operable to store data to be inputted; and a control unit operable to search the data for a word that is recognized by the speech recognition unit and output corresponding information.

Also, the information search apparatus further comprises: an action history word obtaining unit operable to obtain an action history word to be recognized based on an action of a user; an action history word storage unit operable to store the obtained action history word; a fixed word storage unit operable to store fixed words to be set previously; a word extracting unit operable to extract new recognition words to be recognized from data to be inputted; and a dictionary storage unit operable to store the created recognition dictionary, wherein the dictionary creating unit may create the recognition dictionary by selecting new registration words from the new recognition words, the fixed words and the action history word, registering the new registration words in the recognition dictionary and adding, to the new registration words, information indicating pronunciations and parts of speech of the new registration words.

In this way, using a recognition dictionary with words that are not included in the data to be inputted makes it possible to reduce speech recognition errors, recognize the presence/absence of the search data and judges whether there is any speech recognition error or not.

For example, any word can be recognized right when using an information search apparatus as a program guidance apparatus of a TV broadcasting program even in the case of saying a past viewed program name that is not included in the latest EPG data. In this way, provided that a user performs a program search, a response such as "no program where celebrity C appears is being broadcast now and will be broadcast within a week" and "movie K is not now being broadcast" can be made, and thus a user-friendly speech interface can be realized.

Also, the data to be inputted is structured data, the word extracting unit extracts attributes of the new recognition words together with the new recognition words, and the dictionary creating unit may create the recognition dictionary by assigning weights to each of the new registration words based on the attributes of the new recognition words and adding, to the new registration words, information concerning the assigned weights and creates the plurality of recognition dictionaries with different weights for the new registration words depending on purposes, these weights being determined based on attributes of the new recognition words, the information search apparatus further comprises a dictionary selection accepting unit operable to accept a dictionary to be selected by a user from the plurality of recognition dictionaries that are stored in the dictionary storage unit, wherein the speech recognition unit recognizes a specific word obtained from a speech signal based on speech of a user by referring to the recognition dictionary accepted by the dictionary selection accepting unit.

In this way, a user who thinks that his or her apparatus has a low speech recognition rate selects an optimum dictionary in a plurality of dictionaries makes it possible to improve the speech recognition rate and realize a user-friendly interface.

Further, the present invention can be realized as a method comprising characteristic steps that corresponds to the units included in this speech recognition dictionary creation apparatus or as a program causing a computer to execute these steps. Also, it is needless to say that this program can be distributed via a recording medium such as a CD-ROM or a communication medium such as the Internet.

Up to this point, with this speech recognition dictionary creation apparatus of the present invention can recognize words that are not included in the latest EPG data as the words to be recognized, detect a speech recognition error and presence or absence of the search data, and realize a user-friendly speech interface.

Further, it is possible to create a plurality of recognition dictionaries and enable a user to switch them, in other words, a user who thinks that his or her apparatus has a low speech recognition rate can select an optimum dictionary in a plurality of dictionaries makes it possible to improve the speech recognition rate and realize a user-friendly interface.

FURTHER INFORMATION ABOUT TECHNICAL BACKGROUND TO THIS APPLICATION

Japanese Patent application No. 2003-068049, filed on Mar. 13, 2003, is incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 3 is a diagram showing a data example stored in a recognition word storage unit;

FIG. 4 is a diagram showing a data example stored in a viewing history word storage unit;

FIG. 5 is a diagram showing the data example of a basic recognition dictionary;

FIG. 6 is a diagram showing the data example of a customized dictionary;

FIG. 7 is a diagram showing a research result on how many times the category of a word is said under each speech condition;

FIG. 8 is a diagram showing the data example of a customized dictionary with weights;

FIG. 10 is a diagram showing an example of the EPG data.

FIG. 13A is a diagram of extract of a customized dictionary with weights shown in FIG. 8 and FIG. 13B is a diagram showing an example of a recognition result;

FIG. 14 is a diagram showing a data example of a customized dictionary on which words whose category is a "program name" is not registered;

FIG. 16 is a diagram showing a data example stored in a recording information storage unit;

FIG. 17 is a diagram showing a data example of a customized recognition dictionary with weights shown in the second embodiment;

FIG. 22 is a diagram showing a data example of music information stored in a music data/music information/listening history storage unit;

FIG. 23 is a diagram showing a data example of listening history stored in the music data/music information/listening history storage unit;

FIG. 24 is a diagram showing an example of an "item weight coefficient" for each category in the fourth embodiment;

FIG. 26 is a diagram showing a data example stored in the restaurant data storage unit;

FIG. 27 is a diagram showing a data example stored in the use information storage unit; and FIG. 28 is a diagram showing an example of an "item weight coefficient" for each category in the fifth embodiment.

DESCRIPTION OF THE PREFERRED EMBODIMENT(S)

First Embodiment

In this first embodiment, a case where a user creates a recognition dictionary for searching a program to be broadcast in the future and actually searches the program will be mainly explained.

Figure 1:
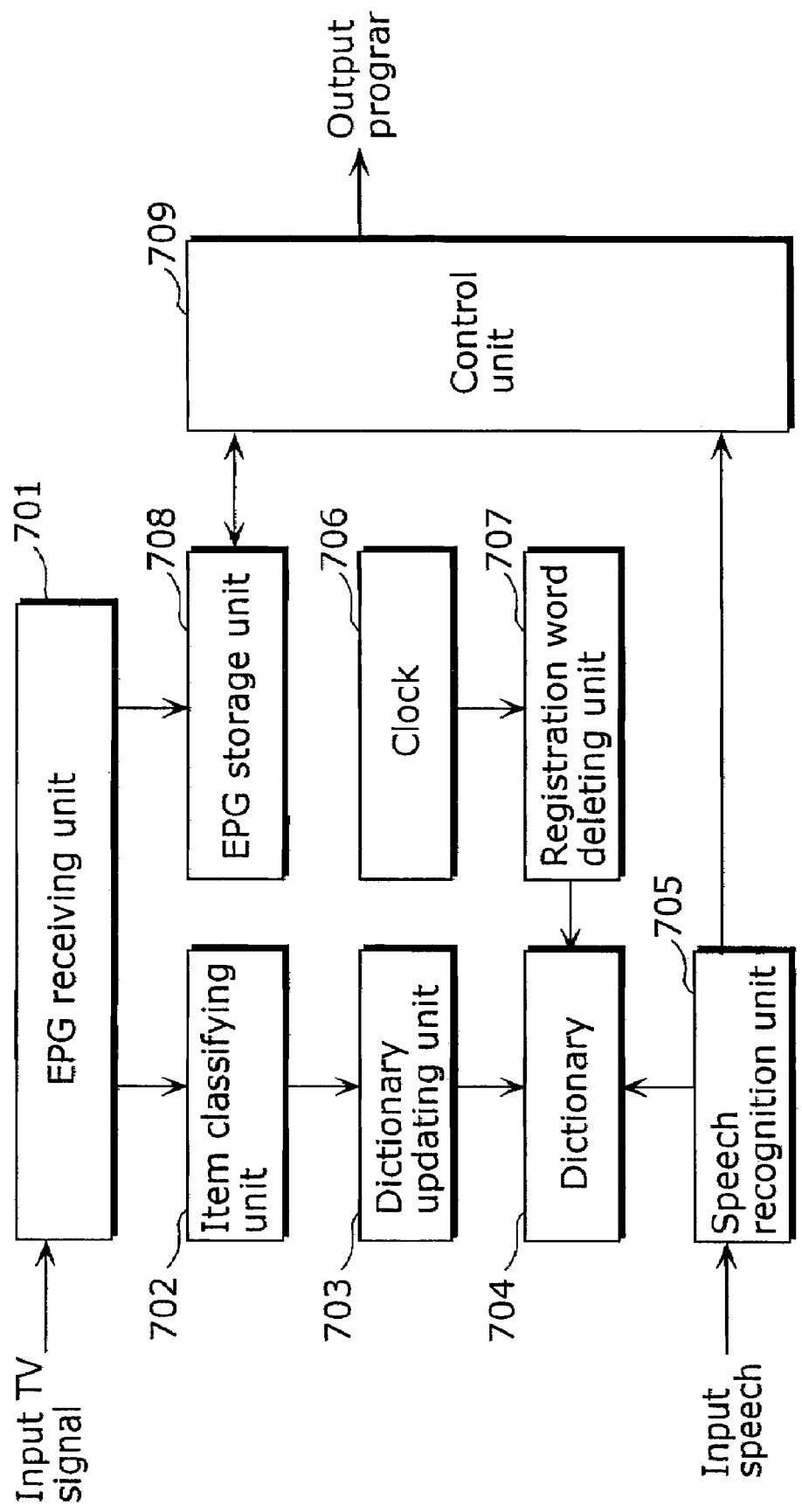
FIG. 1 is a block diagram showing the structure of a program guidance apparatus including a conventional speech recognition dictionary creation apparatus.
Figure 2:
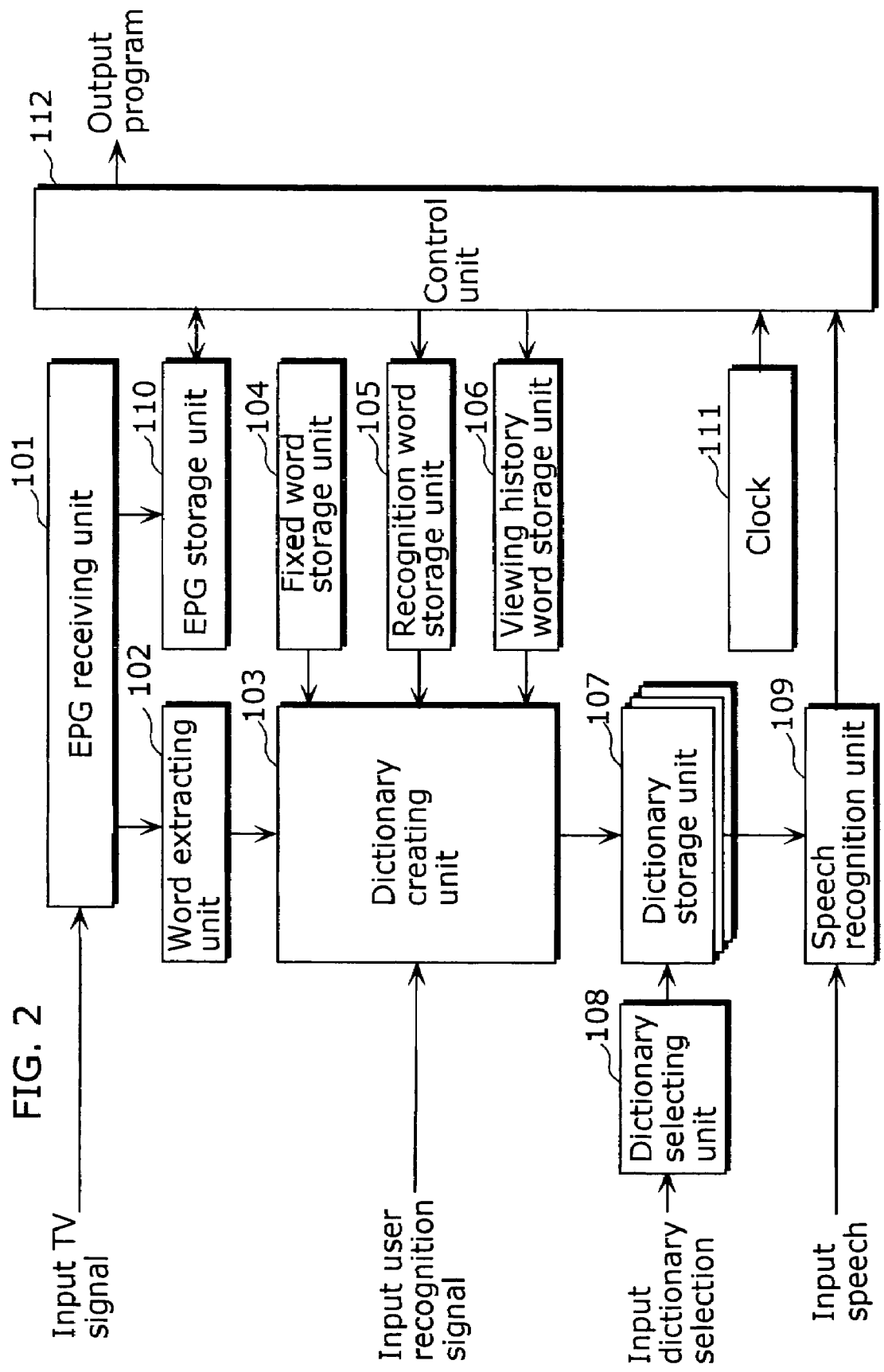
FIG. 2 is a block diagram showing the structure of a program guidance apparatus including a speech recognition dictionary creation apparatus concerning the first embodiment of the present invention.

FIG. 2 is a block diagram showing the structure of the program guidance including the speech recognition dictionary creation apparatus concerning the first embodiment of the present invention.

The program guidance apparatus comprises an EPG receiving unit 101, a word extracting unit 102, a dictionary creating unit 103, a fixed word storage unit 104, a recognition word storage unit 105, a viewing history word storage unit 106, a dictionary storage unit 107, a dictionary selecting unit 108, a speech recognition unit 109, an EPG storage unit 110, a clock 111 and a control unit 112.

The EPG receiving unit 101 demultiplexes the EPG data from the inputted TV signal. The word extracting unit 102 extracts a new recognition word such as "program title", "cast" and "genre" that is a word to be recognized from the EPG data. In the fixed word storage unit 104, words indicating time, broadcasting station or the like and fixed words such as "朝", "6 時", "の", "ニュース", "を", "見たい" that are necessary for normal speech recognition are stored.

The recognition word storage unit 105 is a storage unit operable to store a past recognition word that is the word recognized by the speech recognition in the past. As shown in FIG. 3 for example, five kinds of data that comprise "characters" of each word used for speech recognition, "pronunciation" of each word, "category" indicating that each word is classified into one of categories such as program name, genre, cast or the like, "speech recognition date and time" of each word and "frequency" indicating how many times each word has been recognized so far. In the case where the same word is recognized, its "speech recognition date and time" is updated to the latest date and time and its "frequency" is incremented by one.

The viewing history word storage unit 106 is a storage unit operable to store viewing history words that are the information of the viewed program. Here, its program name and the cast are recorded as the information of the viewed program and, as shown in FIG. 4 for example, its "characters", "viewing date and time" of the program, its "category" and its "frequency" are recorded. In the case where the same words are recorded, its "viewing date and time" is updated to the latest date and time and its "frequency" is incremented by one.

The dictionary creating unit 103 creates a basic recognition dictionary, as shown in FIG. 5 for example, by adding information such as pronunciations and parts of speech that are necessary for speech recognition to new recognition words extracted by the word extracting unit 102 and fixed words stored in the fixed word storage unit 104 in the same way of creating a conventional speech recognition dictionary. Also, the dictionary creating unit 103 creates a customized recognition dictionary, as shown in FIG. 6 for example, by referring to the past recognition word stored in the recognition word storage unit 105 and viewing history words stored in the viewing history word storage unit 106, and in the case where there is any new word other than the words that have already been registered in the basic recognition dictionary, by adding the new words in the basic recognition dictionary as one of the registered words.

By the way, as to how many times the category (attribute) of a word is said, in other words "frequency", for enabling a user to search the word using the program guidance apparatus differs depending on which speech condition is employed, the speech condition 1 being employed when a user searches a program to be broadcast in the future, while the speech condition 2 being employed when a user searches a program which has been viewed or recorded before.

FIG. 7 is a diagram showing the result of searching how many times the category of a word is said under each of the speech conditions. As shown in FIG. 7, "genre" (44.8%) is the most frequent and "program contents" (9.5%) is the second most frequent in the case of speech condition 1 except "date and time", while "program name" (26.7%) is the most frequent and "genre" (23.3%) is the second most frequent in the case of speech condition 2.

The dictionary creating unit 103 determines an "item weight coefficient" by assigning a weight to each key word according to the category of the word with this reason.

Further, the dictionary creating unit 103 determines a "history weight coefficient" by assigning a weight to each key word depending on which case—the case where the word is stored in the recognition word storage unit 105 as a past recognition word and the case where the word is stored in the viewing history word storage unit 106 as a viewing history word—is employed so as to store the word. After that, the dictionary creating unit 103, as shown in FIG. 8 for example, creates a customized recognition dictionary with weights where "item weight coefficient" and "history weight coefficient" in addition to "characters", "pronunciation" and "category" are stored.

Here, "item weight coefficients" are given in the following way: "1.11" to a word whose category is "program name"; "1.27" to a word whose category is "date and time"; "1.06" to a word whose category is "broadcasting station/a channel"; and "1.49" to a word whose category is "genre" and "1.07" to a word whose category is "cast".

Also, "history weight coefficients" are given in the following way: "1.2" to a word stored in the recognition word storage unit 105 as a past recognition word; "1.1" to a word stored in the viewing history word storage unit 106 as a viewing history word and "1.3" to a word stored both in the recognition word storage unit 105 and the viewing history word storage unit 106.

The dictionary storage unit 107 is a storage unit operable to store a plurality of dictionaries to be used for speech recognition that are created by the dictionary creating unit 103. The dictionary selecting unit 108 accepts the optimum dictionary selected by a user from a plurality of dictionaries. The speech recognition unit 109 recognizes a specific word obtained from a speech signal based on user's pronunciations by referring to the dictionary accepted by the dictionary selecting unit 108. The clock 111 outputs the present date and time to the control unit 112. The EPG storage unit 110 is a storage unit operable to store the EPG data.

The control unit 112 searches the EPG data stored in the EPG storage unit 110 based on the words recognized by the speech recognition unit 109 and outputs the information concerning the program. Also, the control unit 112 outputs the information concerning the words recognized by the speech recognition unit 109 and outputs the speech recognition date and time and the like to the recognition word storage unit 105. Further, the control unit 112, at the time when a user viewed a program over the predetermined time, obtains viewing history words that are the information concerning the program and outputs the words to the viewing history word storage unit 106. Also, the control unit 112 deletes a past recognition word that has been stored over the predetermined time from the speech recognition date and time in a group of past recognition words that are stored in the recognition word storage unit 105. Likewise, the control unit 112 deletes viewing history words that have been stored over the predetermined time from the viewing date and time in a group of viewing history words that are stored in the viewing history word storage unit 106.

The operation of the program guidance apparatus formed as shown above can be divided into the off-line processing for creating a dictionary and the on-line processing for recognizing the inputted speech with reference to the created dictionary and guiding the program.

Figure 9:
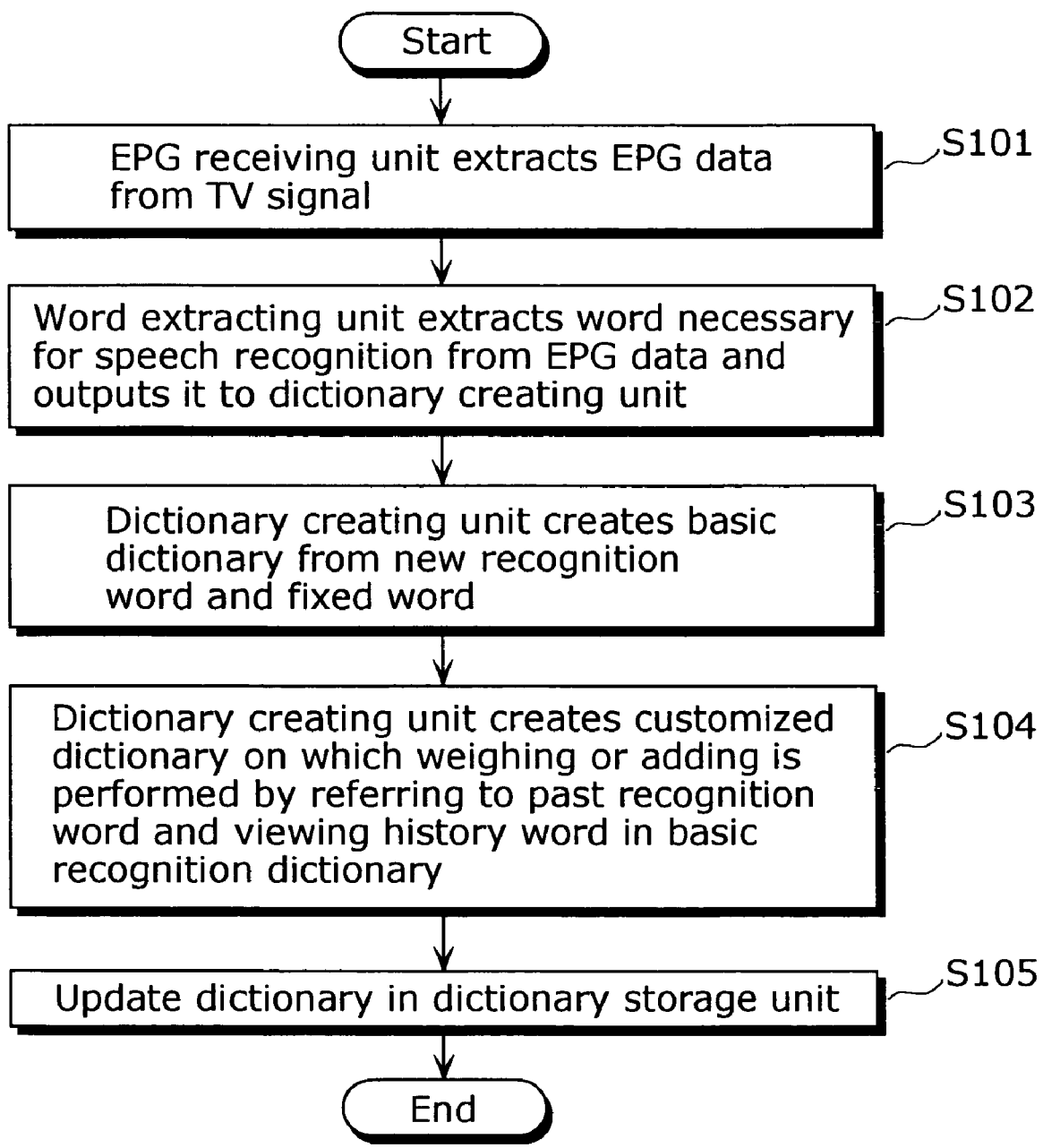
FIG. 9 is a flow chart showing the operation of an off-line processing performed by the program guidance apparatus.

First, the operation of the off-line processing will be explained. FIG. 9 is a flow chart showing the operation of the off-line processing in the program guidance apparatus.

The EPG receiving unit 101 where a TV signal is inputted extracts the EPG data from the TV signal and outputs it to the word extracting unit 102 and the EPG storage unit 110 (step S101).

Next, the word extracting unit 102 extracts "program name", "cast" and "genre" as new recognition words that become key words for speech recognition from the EPG data (step S102).

FIG. 10 is a diagram showing an example of EPG data. The EPG data for each program comprises the following classified items: "service ID" for identifying a broadcasting station; "event ID" for identifying each program; "starting date" indicating the year; month and day when the program is started; "starting time" indicating what time the program is started; "duration" indicating the broadcasting time duration of the program; "event name" indicating the program name; and "text" indicating the cast and the program contents and "genre" indicating the program genre.

Also, fixed words concerning items of "service ID", "event ID", "starting date", "starting time" and "duration time" are previously stored in the fixed word storage unit 104.

Next, the dictionary creating unit 103 creates a basic recognition dictionary using new recognition words inputted from the word extracting unit 102, fixed words stored in the fixed word storage unit 104 and the information concerning pronunciations and parts of speech, which are necessary for speech recognition, stored in the fixed word storage unit 104 in the same way of creating a conventional recognition dictionary (step S103).

Next, the dictionary creating unit 103 creates a customized recognition dictionary, as shown in FIG. 6 for example, by referring to the viewing history words inputted from the viewing history word storage unit 106 and the past recognition word inputted from the recognition word storage unit 105, and in the case where there is any word other than the words that have already been registered in the basic recognition dictionary, by adding the word to the group of words that have already been registered in the basic recognition dictionary. Further, the dictionary creating unit 103 assigns weights to each key word depending on the category of the word and which case—the case where the word is stored in the recognition word storage unit 105 as a past recognition word and the case where the word is stored in the viewing history word storage unit 106 as a viewing history word—is employed so as to store a word, and, for example as shown in FIG. 8, creates a customized recognition dictionary with weights where "item weight coefficient" and "history weight coefficient" in addition to "characters", "pronunciation" and "category" are recorded (step S104).

Next, the dictionary creating unit 103 stores the basic recognition dictionary, the customized recognition dictionary and the customized recognition dictionary with weights that have just been created in the dictionary storage unit 107 (step S105). At this time, the dictionary creating unit 103 updates the respective dictionaries that had been stored earlier in the dictionary storage unit 107 by replacing those old dictionaries with these newly created ones respectively.

Note that the dictionary where "item weight coefficient" and "history weight coefficient" are recorded is created as the customized recognition dictionary with weights in this embodiment, but the dictionary is not limited to this. For example, the dictionary may be the dictionary to which only one of "item weight coefficient" and "history weight coefficient" is added. Also, the values of "item weight coefficient" and "history weight coefficient" are not limited to the values mentioned in the above example, any other values are possible.

Also, a weight is assigned to the "history weight coefficient" based on the past recognition word and the viewing history words, but it may be performed based on only one of those. Further, it is also possible to add "weight coefficients" of the past recognition word and the viewing history words to the dictionary. Also, it is possible to change the "weight coefficient" based on the recognition times, viewing times, time or the like.

Also, a customized recognition dictionary with a similar effect can be created even in the case of using only one of the viewing history words or a past recognition word.

Also, in the case where the hard resources are scarce, for example, it is possible to delete new recognition words of the genre in which a program with a low use frequency is classified instead of assigning weights.

Also, at the time when a user searches a program to be broadcast in the future, it is possible not to record words whose category is "program name" providing that no program name is said as shown in FIG. 14.

Also, a customized dictionary with weights can create a plurality of dictionaries with weights that differs depending on the categories of words. Also, it is possible to create a recognition dictionary for each user so as to create a plurality of customized recognition dictionaries by inputting a user recognition signal for recognizing a user in the dictionary creating unit 103.

Here, for example, in the case of creating a customized recognition dictionary capable of recognizing a word of "cast", it is possible to assign weights by putting a higher priority in speech recognition to a word of "cast" than to words of "genre" and "program".

Also, as to a word of "cast", it is possible to determine the priority in speech recognition by referring to the use frequency of the viewing history words and the past recognition word and adapting it to user's taste.

Also, as to the words, in the viewing history words and the past recognition word, that have already been included in the basic recognition dictionary, as it is highly likely that these words are used by a user again, it is possible to create a customized recognition dictionary with weights that is suitable for the user under the use status by setting a weight coefficient with a higher priority in speech recognition to those words.

Also, the dictionary creating unit 103 creates three recognition dictionaries of the basic recognition dictionary, the customized recognition dictionary and the customized recognition dictionary with weights in this embodiment, but dictionaries are not limited to those. For example, it is also possible to create two recognition dictionaries of the basic recognition dictionary and either the customized recognition dictionary or the customized recognition dictionary with weights.

Also, the operation of the off-line processing for creating a dictionary is executed for each predetermined time period, for example, once a day, but this execution time may be determined based on the viewing history.

Figure 11:
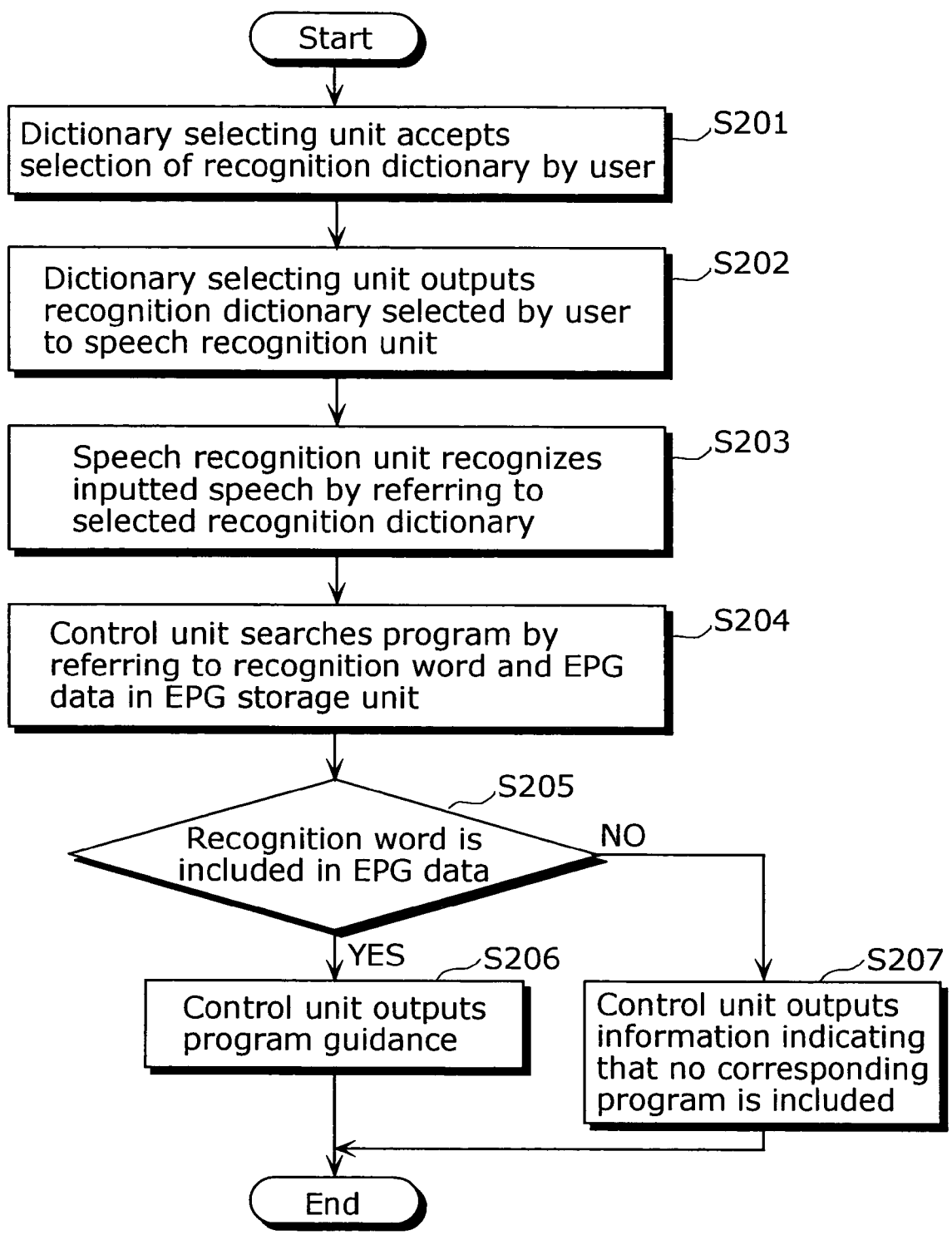
FIG. 11 is a flow chart showing the operation of an off-line processing performed by the program guidance apparatus.

Next, the operation of the on-line processing will be explained. FIG. 11 is a flow chart showing the operation of on-line processing in the program guidance apparatus.

Figure 12:
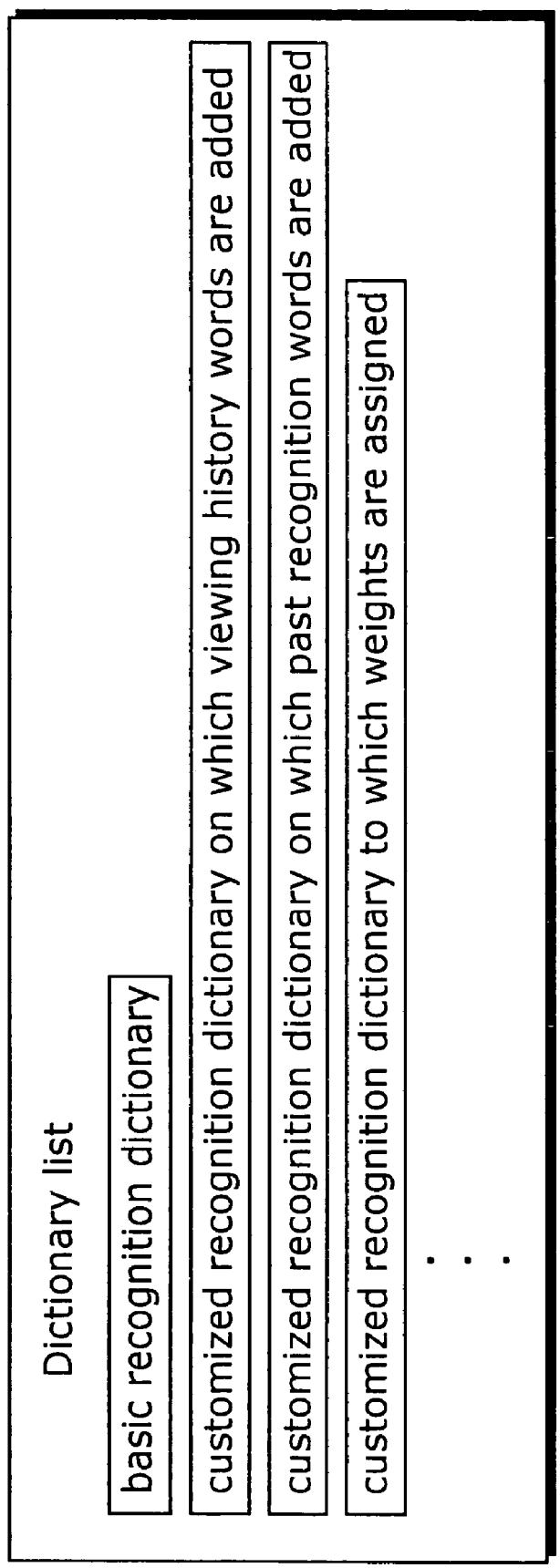
FIG. 12 is a diagram showing an example of a display screen for selecting a recognition dictionary in a plurality of recognition dictionaries.

The dictionary selecting unit 108 displays a plurality of recognition dictionaries stored in the dictionary storage unit 107 using, for example, a display screen shown in FIG. 12 and accepts the recognition dictionary selected by a user (step S201).

Next, the dictionary selecting unit 108 outputs the recognition dictionary selected by the user to the speech recognition unit 109 (step S202). Note that it is also possible to output the basic recognition dictionary to the speech recognition unit 109 as the initial setting.

Here, displaying the category of the recognition dictionary selected by the user on a part of the TV display screen makes it possible to help a user to input speech contents based on the contents of the recognition dictionary.

Next, the speech recognition unit 109 recognizes the specific words from the inputted speech by referring to the recognition dictionary selected by the user (step S203). Here is explained the recognition result in the case where a user says "I want to see sports program." under the status that the customized recognition dictionary with weights shown in FIG. 8 is selected by the user. FIG. 13A is a diagram of extract of a customized dictionary with weights shown in FIG. 8 and FIG. 13B is a diagram showing an example of a recognition result. The speech recognition unit 109 first calculates a score like general speech recognition. Provided that scores are as follows: 500 for "スポーツ天国", 300 for "スポーツ", 200 for "まるごとスポーツ". The speech recognition unit 109 obtains the final score by multiplying the calculated score, the "item weight coefficient" that is registered in the customized recognition dictionary with weights by the "history weight coefficient". As the result, the speech recognition unit 109 recognizes "スポーツ" as the final recognition result based on the final score.

Next, the control unit 112 searches a program by referring to the words recognized in the speech recognition unit 109 (written as recognition word from here) and the EPG data stored in the EPG storage unit 110 (step S204). In other words, the control unit 112 searches the EPG data stored in the EPG storage unit 110 based on the recognition words. After that, the control unit 112 judges whether the recognition words are included in the EPG data or not (step S205).

As the result, in the case where the recognition words are included in the EPG data (the answer of the step S205 is YES), the control unit 112 indicates the corresponding program (step S206).

On the other hand, in the case where no recognition word is included in the EPG data (the answer of the step S205 is NO), as no corresponding program is included in it, the control unit 112 makes a response such as "no program where celebrity C appears is being broadcast now and will be broadcast within a week" and "movie K is not now being broadcast" (step S207).

Here, as the recognition dictionary is created using the user viewing history and recognition history, in the case where the words used for speech recognition are included in the recognition dictionary but is not included in the EPG data, the control unit 112 judges that no speech recognition error occurred, and which makes it possible to make a response on presence/absence of the corresponding program.

With the above-mentioned structure, it is possible to recognize the words that are not included in the latest EPG data as the words to be recognized by creating a recognition dictionary by referring to the EPG data, the user viewing history and speech recognition history, identify a speech recognition error and the presence/absence of the search data in the case where a program search is performed and realize a user-friendly speech interface.

Also, as the recognition dictionary is created by assigning weights to the registered words so as to add an "item weight coefficient" and a "history weight coefficient" and the like on each of them, it is possible to improve the speech recognition rate.

Further, as a plurality of recognition dictionaries are created and one of the recognition dictionaries is selected to be used by a user and accepted, a user who thinks that the recognition rate of a speech recognition unit 109 is low can select the optimum dictionary from a plurality of dictionaries, which makes it possible to improve the recognition rate and realize a user-friendly interface.

Second Embodiment

The case will be explained in this second embodiment is the case where the user who is explained in the first embodiment creates a recognition dictionary for searching a program that has already been recorded (or viewed) before in addition to the recognition dictionary for searching a program to be broadcast in the future and performs a search according to the object.

Figure 15:
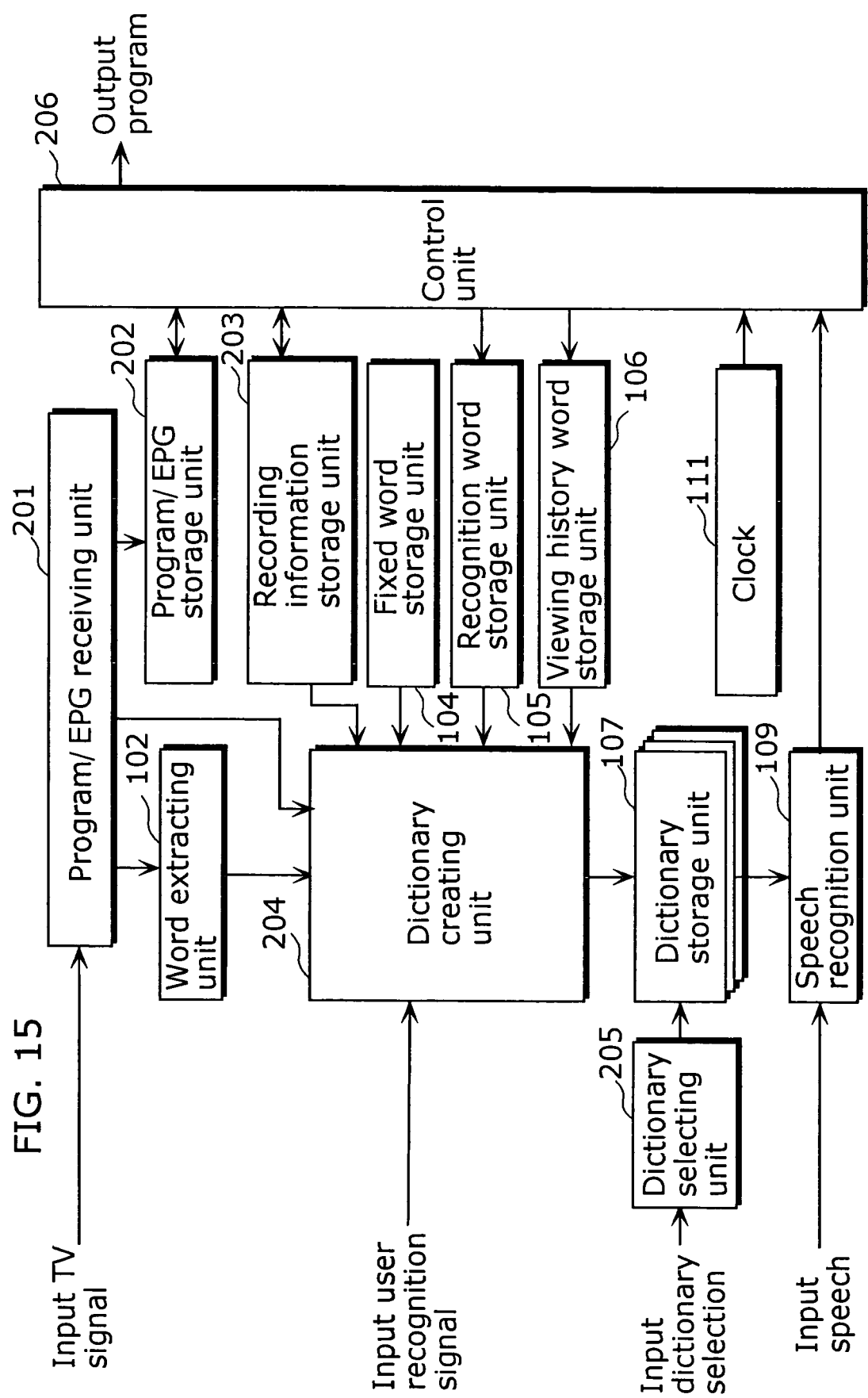
FIG. 15 is a block diagram showing the structure of a program guidance apparatus including a speech recognition dictionary creation apparatus concerning the second embodiment of the present invention.

FIG. 15 is a block diagram showing the structure of the program guidance apparatus including the speech recognition dictionary creation apparatus concerning the second embodiment of the present invention. As to the same units as the first embodiment, the same reference numbers are assigned to them and detailed explanations on them are omitted.

This program guidance apparatus includes a program/EPG receiving unit 201, a program/EPG storage unit 202 and a recording information storage unit 203 as shown in FIG. 15 instead of the EPG receiving unit 101 and the EPG storage unit 110 in the first embodiment of the present invention. Also, the operations of the dictionary creating unit 204, the dictionary selecting unit 205 and the control unit 206 differs from the ones in the first embodiment.

The program/EPG receiving unit 201 demultiplexes the EPG data and the program data from the inputted TV signal. The program/EPG storage unit 202 is a storage unit operable to store the EPG data and the program data. The recording information storage unit 203 is a storage unit operable to store the information concerning recorded programs. For example as shown in FIG. 16, here are recorded the following data: "characters" indicating the recorded program name; "viewing date and time" indicating the date and time when the program was recorded; and "category" indicating the program genre and "reservation/storage" indicating which of the user and the system made the reservation for recording the program. Note that the case where the system makes a reservation for recording is, for example, the case where it videotapes all the programs which are selected based on the key words specified by the user or the like.

The control unit 206 outputs the information concerning the program to be recorded to the recording information storage unit 203.

The dictionary creating unit 204 creates, as shown in FIG. 17 for example, the customized recognition dictionary with weights, which is created by changing the "item weight coefficient" of the customized recognition dictionary with weights that is explained in the first embodiment based on, for example, the result of searching the speech frequency shown in FIG. 7, as the recognition dictionary for searching a program that has already been recorded (or viewed) before. Here, "item weight coefficients" are given in the following way: "1.11" to a word whose category is "program name" (that has not been viewed yet); "1.30" to a word whose category is "program name" (that has already been viewed); "1.30" to a word whose category is "date and time"; "1.03" to a word whose category is "broadcasting station/a channel"; "1.49" to a word whose category is "genre" and "1.07" to a word whose category is "cast". At this time, the dictionary creating unit 204 judges whether the program is a program that has not been viewed yet or the program is a program that has already been viewed based on the information of "reservation/storage" stored in the recording information storage unit 203. In other words, it judges that the program is the program that has not been viewed yet in the case where the system made the reservation for recording the program, while it judges that the program is the program that has already been viewed in the case where the user made the reservation for recording the program.

The dictionary selecting unit 205 accepts the instruction, from a user, indicating whether the program in search is a program to be broadcast in the future or the program in search is a program that has already been recorded (or viewed), and selects a recognition dictionary according to the program in search. In other words, for example as explained in FIG. 8 in the first embodiment, a customized recognition dictionary with higher weights for "genre" of the category is selected in the case where the program in search is the program to be broadcast in the future, and for example as explained in FIG. 17, a customized recognition dictionary with higher weights for "program name" of the category is selected in the case where the program in search is the program that has already been viewed or recorded before.

Figure 18:
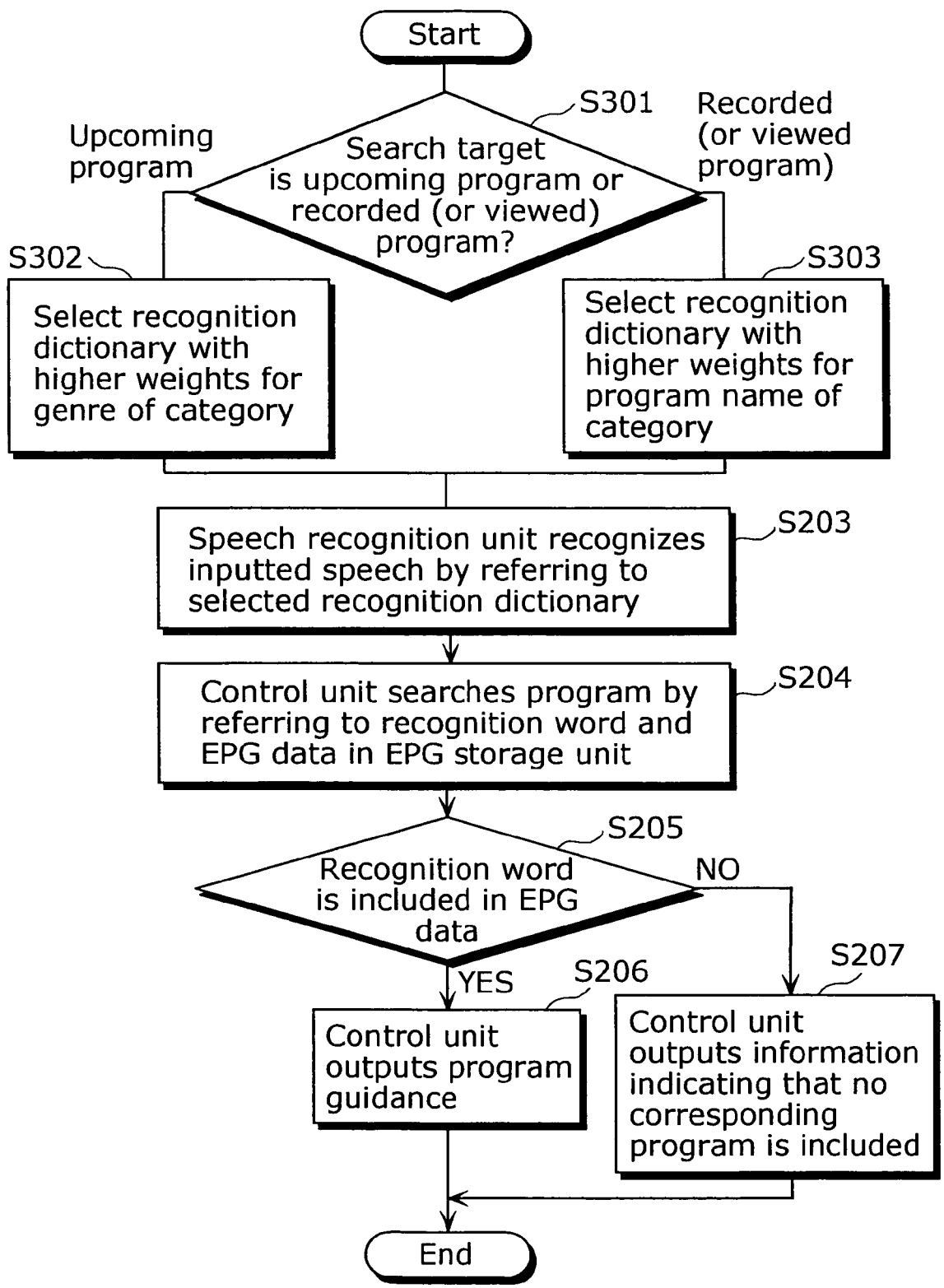
FIG. 18 is a flow chart showing the operation of an off-line processing performed by the program guidance apparatus shown in the second embodiment.

Next, the operation of the on-line processing of the program guidance apparatus formed as shown above will be explained. FIG. 18 is a flow chart showing the operation of the on-line processing in the program guidance apparatus. Note that the operation of the off-line processing will be omitted because it is the same as the first embodiment.

The dictionary selecting unit 205 accepts the instruction, from a user, indicating whether the program in search is a program to be broadcast in the future or the program in search is a program that has already been viewed or recorded (step S301). Here, a customized recognition dictionary with higher weights for "genre" of the category is selected as the recognition dictionary that is used in the speech recognition unit 109 (step S302) in the case where the program in search is the program to be broadcast in the future. On the other hand, a customized recognition dictionary with higher weights for "program name" of the category is selected as the recognition dictionary that is used in the speech recognition unit 109 (step S303) in the case where the program in search is the program that has already been viewed or recorded before.

The following operations (step S203 to S207) are the same as the embodiment 1.

As explained up to this point, a plurality of recognition dictionaries are created and one of the recognition dictionaries is selected for using it in the speech recognition unit 109 depending on whether the program in search is a program to be broadcast in the future or the program in search is a program that has already been recorded (or viewed) before, which makes it possible to improve the speech recognition rate and realize a user-friendly interface.

In this embodiment, "reservation/storage" indicating that whether the user made the reservation for recording the program or the system made the reservation for recording the program is recorded as the recording information that is stored in the recording information storage unit 203, but information is not limited to this. For example, the following pieces of information may be stored instead: the information indicating whether the user made the reservation for recording the program or the user recorded the program without reservation; the information indicating whether the user has already viewed the program or the user has not viewed the program yet; and the information indicating whether the user made the reservation for recording the program using the EPG or the user made the reservation by specifying the date and time of the program broadcasting or the like. Also, a plurality of these pieces of information may be used.

Third Embodiment

The third embodiment will explain the case where the recognition dictionary is partly altered and the words that were registered before a predetermined time period are deleted from all the words that are registered in the recognition dictionary, while a newly created recognition dictionary replaces the old recognition dictionary at the time of updating in the first embodiment.

Figure 19:
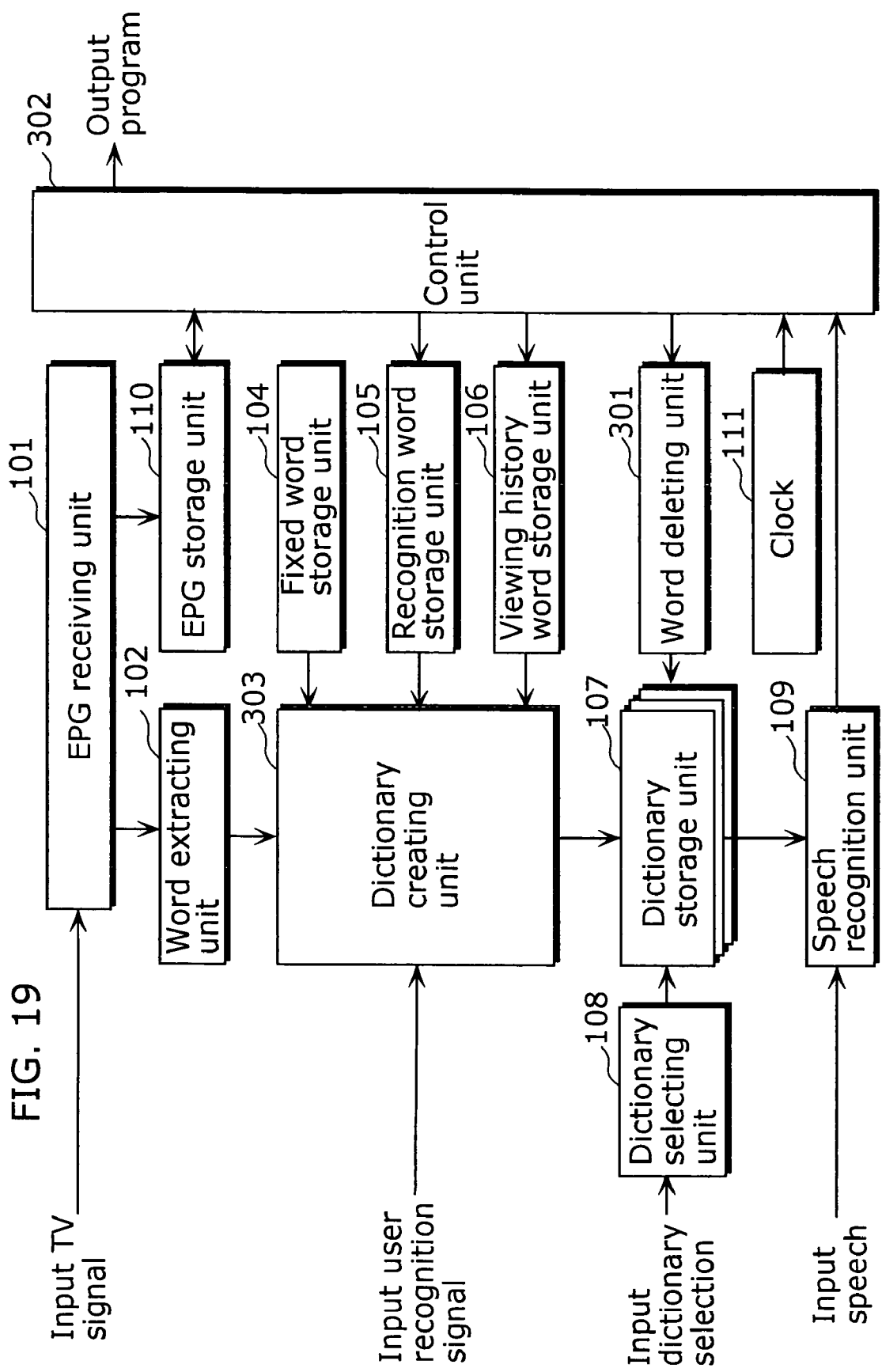
FIG. 19 is a block diagram showing the structure of the program guidance apparatus including the speech recognition dictionary creation apparatus concerning the third embodiment of the present invention.

FIG. 19 is a block diagram showing the structure of the program guidance apparatus including the speech recognition dictionary creation apparatus concerning the third embodiment of the present invention. As to the same units as the first embodiment, the same reference numbers are assigned to them and detailed explanations on them are omitted.

This program guidance apparatus includes a word deleting unit 301 in addition to the structure of the first embodiment as shown in FIG. 15. Also, the operations of the dictionary creating unit 303 and the control unit 302 differ from the operations explained in the first embodiment.

The dictionary creating unit 303, after creating a basic recognition dictionary, a customized recognition dictionary and a customized recognition dictionary with weights like in the first embodiment, updates the different part in the basic recognition dictionary, the customized recognition dictionary and the customized recognition dictionary with weights that are stored in the dictionary storage unit 107.

The word deleting unit 503 deletes the words that have already been registered before a predetermined time period (such as a week) from all the words stored in the recognition dictionary by referring to the date and time of the clock 111, the program descriptions outputted from the control unit 112, the past recognition word outputted from the recognition word storage unit 105.

Figure 20:
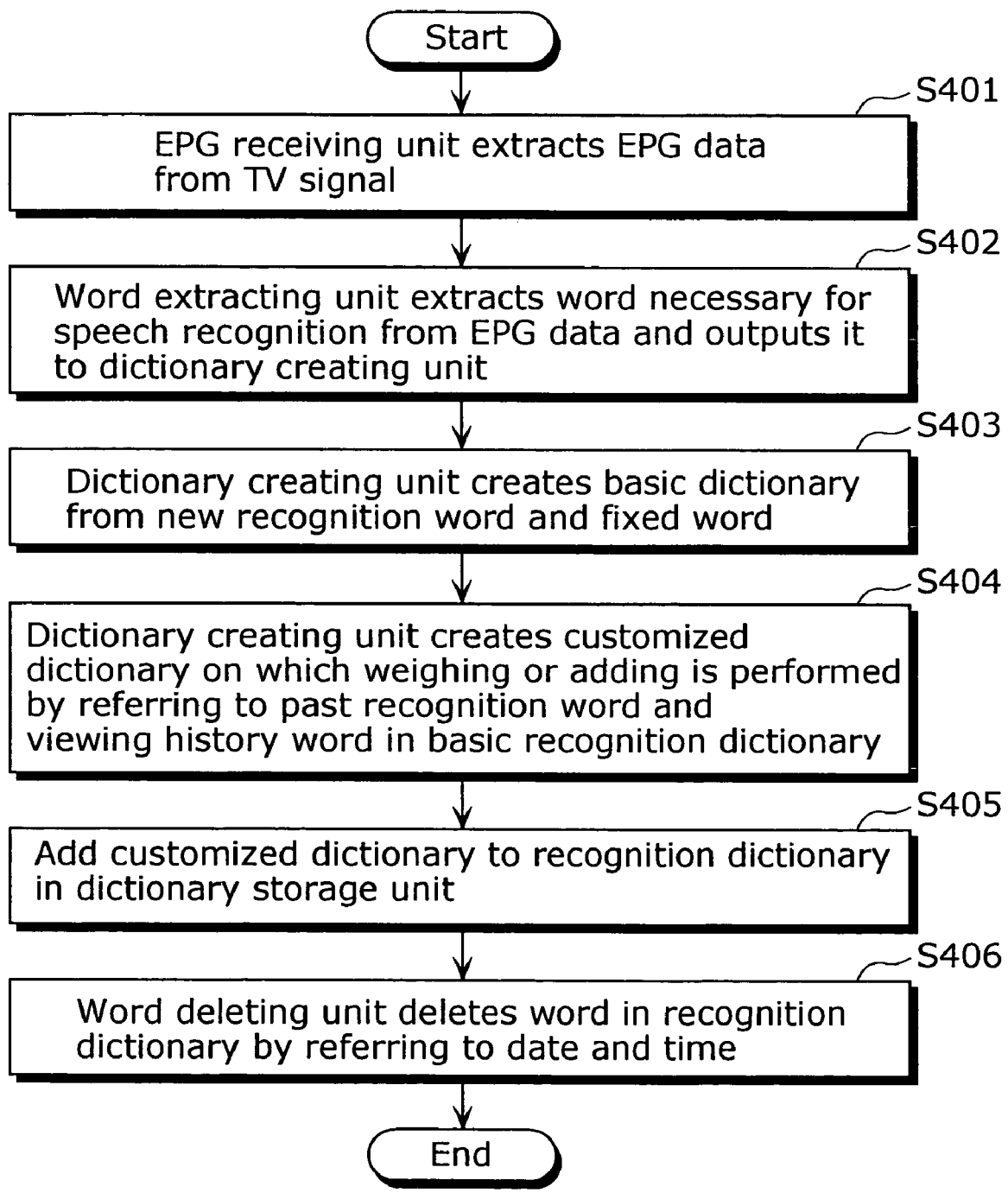
FIG. 20 is a flow chart showing the operation of an off-line processing performed by the program guidance apparatus shown in the third embodiment.

Next, the operation of the off-line processing of the program guidance apparatus that is formed as shown above will be explained. FIG. 20 is a flow chart showing the operation of the on-line processing of the program guidance apparatus. The explanation on the operation of the on-line processing is omitted because it is the same as the first embodiment.

The EPG receiving unit 101 where a TV signal is inputted extracts the EPG data from the TV signal and outputs it to the word extracting unit 102 and the EPG storage unit 110 (step S401).

Next, the word extracting unit 102 extracts "program name", "cast" and "genre" as the new recognition words that become the key words for speech recognition from the EPG data (step S402).

Next, the dictionary creating unit 103 creates a basic recognition dictionary using the information such as new recognition words inputted from the word extracting unit 102, fixed words stored in the fixed word storage unit 104 and the information concerning pronunciations and parts of speech, which are necessary for speech recognition, stored in the fixed word storage unit 104 in the same way of creating a conventional recognition dictionary (step S403).

Next, the dictionary creating unit 103 creates a customized recognition dictionary, as shown in FIG. 6 for example, by referring to viewing history words to be inputted from the viewing history word storage unit 106 and a past recognition word to be inputted from the recognition word storage unit 105, and in the case where there is any new word other than the words that have already been registered in the basic recognition dictionary, by adding the new words to the basic recognition dictionary words. Further, the dictionary creating unit 103 assigns weights to each key word depending on the category of the word and which case—the case where each word is stored in the recognition word storage unit 105 as a past recognition word and the case where each word is stored in the viewing history word storage unit 106 as a viewing history word—is employed so as to store a word, and, for example as shown in FIG. 8, creates a customized recognition dictionary with weights where "item weight coefficient" and "history weight coefficient" in addition to "characters", "pronunciation" and "category" are recorded (step S404).

Next, the dictionary creating unit 103 calculates the differences between the recognition dictionaries (a basic dictionary, a customized dictionary and a customized dictionary with weights) that are stored in the dictionary storage unit 502, extracts, from the newly created recognition dictionaries, the words that are not included in the old recognition dictionaries, and then registers these new registration words in the dictionary storage unit 107 so as to alter and update these recognition dictionaries (step S405).

Next, the word deleting unit 301 deletes the words that have already been registered before a predetermined time period (such as a week) with reference to the date and time of the clock 111, the date and time attached to the words in the recognition words. Note that the time period for the deletion can be set by a user. Further, the time period for the deletion of the words included in the customized recognition dictionary can be longer than that of the words included in the basic dictionary, and also, the words concerning the programs that have already been viewed in the past can be excluded from the words to be deleted based on a user viewing history. Further, it is also possible to change the time period for the deletion depending on the category of the word, the genre or the like.

In the case where the hardware resources are scarce, for example, the new recognition words of the genre into which programs with a low user use frequency are classified may also be deleted instead of assigning weights.

Also, it is possible to create a plurality of customized recognition dictionaries with different weights depending on the category of the words. Also, it is possible to create a viewing history for each user so as to create a plurality of customized recognition dictionaries.

Also, a customized recognition dictionary with a similar effect can be created even in the case of using only one of the viewing history words or a past recognition word.

Also, the updated date and time is attached to the updated word, and in the case where the same word is included in the old recognition dictionaries, the update dates and time that are attached to the word again.

With the above-mentioned structure, it is possible to recognize the words that are not included in the latest EPG data as the words to be recognized by creating a recognition dictionary by referring to the EPG data, the user viewing history and speech recognition history and by altering the previously created recognition dictionaries, and it is also possible to recognize a speech recognition error and the presence/absence of the search data in the case where a program search is performed, and thus it becomes possible to realize a user-friendly speech interface.

Further, as a plurality of recognition dictionaries are created and one of the recognition dictionaries is selected to be used by a user and accepted, a user who thinks that the recognition rate of a speech recognition unit 109 is low can select the optimum dictionary from a plurality of dictionaries, which makes it possible to improve the recognition rate and realize a user-friendly interface.

Fourth Embodiment

The case where music contents is searched will be explained in the fourth embodiment explains, while the case where a TV broadcasting program is searched has already been explained in the embodiments 1 to 3.

Figure 21:
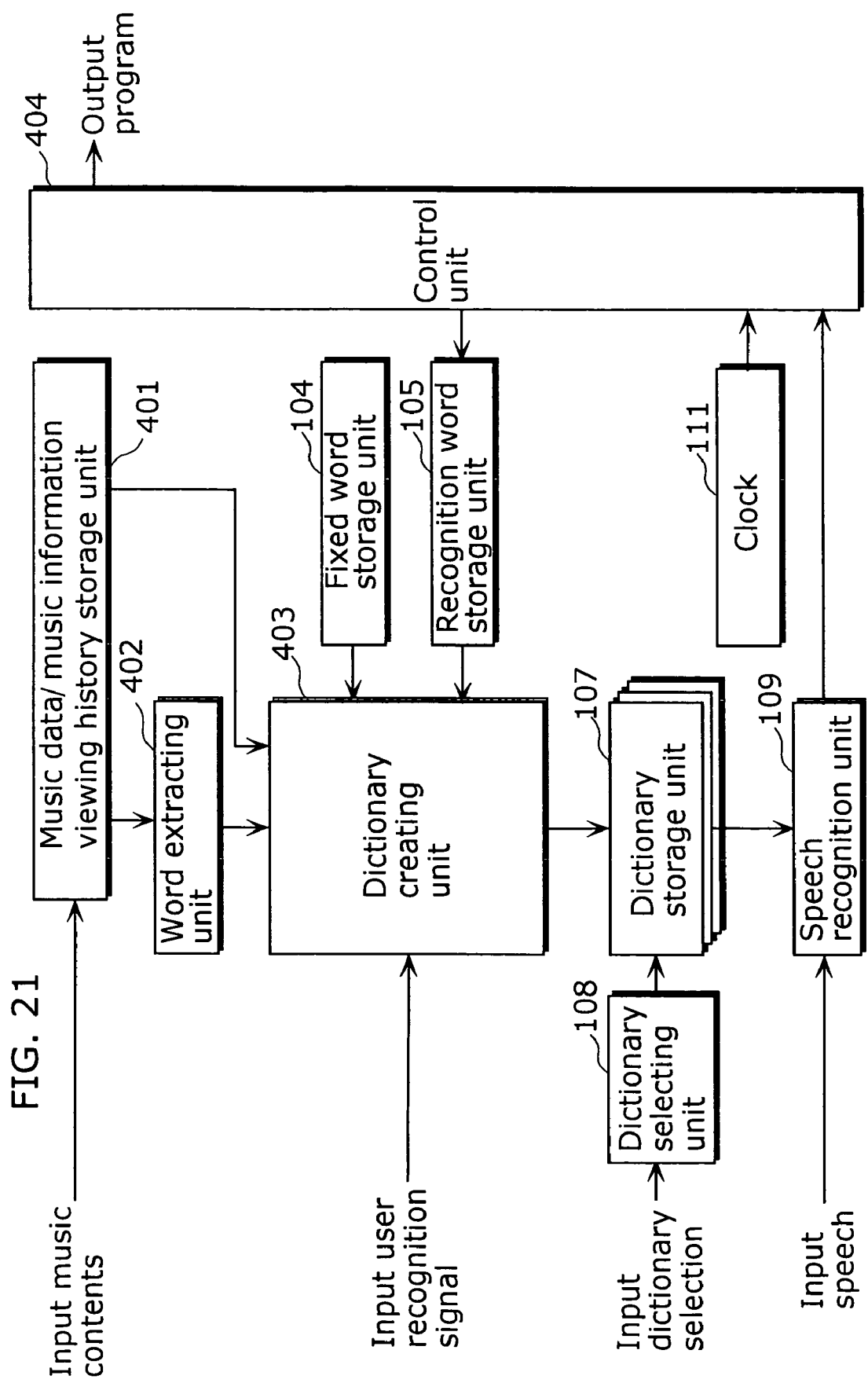
FIG. 21 is a block diagram showing the structure of a music guidance apparatus including a speech recognition dictionary creation apparatus concerning the fourth embodiment of the present invention.

FIG. 21 is a block diagram showing the structure of the music guidance apparatus including the speech recognition dictionary creation apparatus concerning the fourth embodiment of the present invention. As to the same units as the ones in the first embodiment, the same reference numbers are assigned to them and detailed explanations on them are omitted.

This music guidance apparatus includes, as shown in FIG. 21, a music/music information/listening history storage unit 401 instead of the EPG receiving unit 101, the viewing history word storage unit 106 and the EPG storage unit 110 in the first embodiment. Also, the operations on the word extracting unit 402, the dictionary creating unit 403 and the control unit 404 differ from the operations in the first embodiment.

The music/music information/listening history storage unit 401 is a storage unit operable to store the music data, music information and listening history. For example, as shown in FIG. 22, here are recorded the following information as the music information: "music title" indicating the title of music; "artist" indicating the player of the music; "album" indicating the name of the album where the music is included; "genre" indicating the genre of the music; and "details" indicating the playing time of the music and the sale date or the like.

Also, for example, as shown in FIG. 23, here are recorded the following information as the listening history: "music title" of music; "listening time period" indicating the time period when the music has been listened to; "listening times" indicating how many times the music has been listened to; and "storage source" indicating where the music came from to be stored.

The word extracting unit 402 extracts new-recognition-words-to-be-recognized which are shown as "music title", "artist", "album", "genre" and the like from the music information.

The dictionary creating unit 403 creates a basic recognition dictionary, like in the above-mentioned first embodiment, by adding information such as pronunciations and parts of speech that are necessary for speech recognition to new recognition words extracted by the word extracting unit 402 and fixed words stored in the fixed word storage unit 104. Also, the dictionary creating unit 403 creates a customized recognition dictionary, by referring to a past recognition word stored in the recognition word storage unit 105, and in the case where there is any new word other than the words that have already been registered in the basic recognition dictionary, by adding the new words in the basic recognition dictionary as one of the registered words.

Also, the dictionary creating unit 403 determines the "item weight coefficients" by assigning weights to key words depending on the categories of the words such as "music title", "artist", "album", "genre" or the like. At this time, the dictionary creating unit 403 determines the "item weight coefficient" by assigning a different weight to each of the categories depending on whether the music has not been listened to yet or the music has already been listened to.

Further, the dictionary creating unit 403 determines the "history weight coefficient" by assigning a weight to each key word depending on whether the word is stored in the recognition word storage unit 105 as a past recognition word or not, whether the word is concerning the music with a listening history or not, which of the user and the system stored the music. Also, the dictionary creating unit 403 creates a customized recognition dictionary with weights in which "item weight coefficient" and "history weight coefficient" in addition to "characters", "pronunciation" and "category" are recorded.

Here, in the case where the music has not been listened to yet, as shown in FIG. 24, "item weight coefficient" are given in the following way: "1.1" to a word whose category is "music title"; "1.2" to a word whose category is "artist"; "1.1" to a word whose category is "album"; and "1.3" to a word whose category is "genre". On the other hand, "item weight coefficients" are given in the following way: "1.3" to a word whose category is "music title"; "1.3" to a word whose category is "artist"; "1.3" to a word whose category is "album"; and "1.3" to a word whose category is "genre".

Also, "history weight coefficients" are given in the following way: "1.2" to a word stored in the recognition word storage unit 105 as a past recognition word; "1.1" to a word stored concerning the music with a listening history and "1.2" to a word concerning the music stored by the user. In the case where the word is classified into several categories, history weight coefficients are added to make a new history weight coefficient, and the new one is assigned to these words.

Note that explanations on the operations of the on-line processing for creating a dictionary in the music guidance apparatus that is formed as explained above and the off-line processing for searching the music by recognizing the speech that is inputted with reference to the created dictionary are omitted because they are the same as the operations in the first embodiment.

With the above-mentioned structure, creating a recognition dictionary by referring to the musing information, the user listening history and the speech recognition history makes it possible to recognize words that are not included in the latest music information as recognition words, recognize a speech recognition error and the presence/absence of the search data in the case where a program is searched, and realize a user-friendly speech interface.

Also, as the recognition dictionary is created by assigning weights to the registered words so as to assign an "item weight coefficient" and a "history weight coefficient" and the like to each of them, it becomes possible to improve the speech recognition rate.

Further, as a plurality of recognition dictionaries are created and one of the recognition dictionaries is selected to be used by a user and accepted, a user who thinks that the recognition rate of a speech recognition unit 109 is low can select the optimum dictionary from a plurality of dictionaries, which makes it possible to improve the recognition rate and realize a user-friendly interface.

In this embodiment, a weight is assigned to each "history weight coefficient" depending on whether a key word is stored in the recognition word storage unit 105 as a past recognition word or not, whether the word is concerning the music with a listening history or not, which of the user and the system stored the music, but a weight may be assigned to the word depending on only one of these. Also, "weight coefficient" may be added to a recognition dictionary depending on the cases that are mentioned above. Also, the "weight coefficient" may be changed depending on recognition times, listening times, time and the like.

Also, a program is supposed to be searched without considering whether the program has not been viewed yet or whether the program has already been viewed, the present invention is not limited to this. For example, in the case where a program is searched depending on whether the program has not been viewed yet or whether the program has already been viewed, it is possible to use a different "item weight coefficient" depending on whether the former case is employed or the latter case is employed.

Fifth Embodiment

The case where shop (restaurant) data is searched will be explained in this fifth embodiment, while the case where music contents is searched has been explained in the fourth embodiment.

Figure 25:
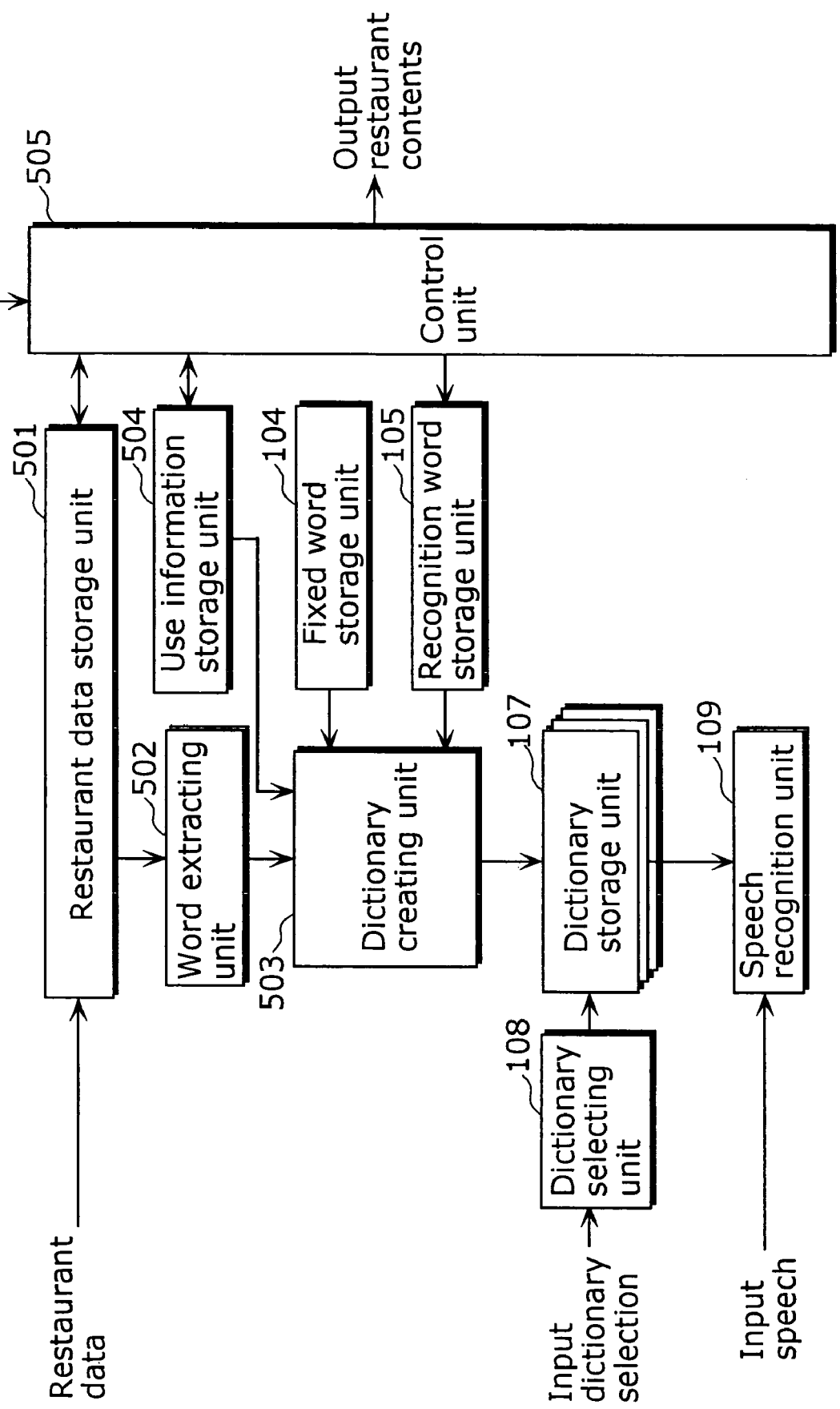
FIG. 25 is a block diagram showing the structure of the information search apparatus including the speech recognition dictionary creation apparatus concerning the fifth embodiment of the present invention.

FIG. 25 is a block diagram showing the structure of the information search apparatus including the speech recognition dictionary creation apparatus concerning the fifth embodiment of the present invention. As to the same units as the first embodiment, the same reference numbers are assigned to them and detailed explanations on them are omitted.

This information search apparatus comprises a restaurant data storage unit 501 and a use information storage unit 504 as shown in FIG. 21 instead of the EPG receiving unit 101, the viewing history word storage unit 106 and the EPG storage unit 110 in the first embodiment. Also, the operations of the word extracting unit 502, the dictionary creating unit 503 and the control unit 505 differ from the ones in the first embodiment.

The restaurant data storage unit 501 is a storage unit operable to store the restaurant data. Here, for example as shown in FIG. 26, the following data are recorded: "restaurant name" indicating the name of the restaurant; "genre 1" indicating the rough genre of the restaurant; "genre 2" indicating the detailed genre of the restaurant; "main menu" indicating the menu that is served in the restaurant; and "business hours" indicating the business hours of the restaurant.

The use information storage unit 504 is a unit operable to store the use information of the restaurant visited by a user. Here, for example as shown in FIG. 27, the following data are recorded: "restaurant name"; "using time period" indicating the time period when the user has used the restaurant; "using times" indicating how many times the user has been used the restaurant; and "using time zone" indicating the time zone when the user has used the restaurant.

The word extracting unit 502 extracts new recognition words such as "restaurant name", "genre 1", "genre 2", "main menu" and the like from the restaurant data.

The dictionary creating unit 503 creates a basic recognition dictionary by adding information such as pronunciations and parts of speech that are necessary for speech recognition to new recognition words extracted by the word extracting unit 502 and fixed words stored in the fixed word storage unit 104 in the same way as in the first embodiment. Also, the dictionary creating unit 503 creates a customized recognition dictionary by referring to a past recognition word stored in the recognition word storage unit 105, and in the case where there is any new word other than the words that have already been registered in the basic recognition dictionary, by adding the new word in the basic recognition dictionary as one of the registered words.

Also, the dictionary creating unit 503 determines an "item weight coefficient" by assigning a weight to each key word depending on the category of a word such as "restaurant name", "genre 1", "genre 2", "main menu" or the like. At this time, the dictionary creating unit 503 determines the "item weight coefficient" by assigning a different weight to each of the categories depending on whether the user has used the restaurant or not.

Further, the dictionary creating unit 503 determines a "history weight coefficient" by assigning a weight to each key word depending on whether the word is stored in the recognition word storage unit 105 as a past recognition word or not. Also, the dictionary creating unit 503 creates a customized recognition dictionary with weights in which "item weight coefficient" and "history weight coefficient" in addition to "characters", "pronunciation" and "category" are recorded.

Here, in the case where the restaurant has not been used yet, as shown in FIG. 28, "item weight coefficient" are given in the following way: "1.1" to a word whose category is a "restaurant name"; "1.4" to a word whose category is "genre 1"; "1.3" to a word whose category is "genre 2"; and "1.3" to a word whose category is "main menu".

On the other hand, in the case where the restaurant has already been used, "item weight coefficient" are given in the following way: "1.4" to a word whose category is a "restaurant name"; "1.3" to a word whose category is a "genre 1"; "1.4" to a word whose category is a "genre 2"; and "1.2" to a word whose category is "main menu".

Also, as "history weight coefficients", "1.5" is given to a word stored in the recognition word storage unit 105 as a past recognition word.

Note that explanations on the operations of the on-line processing for creating a dictionary in the information search apparatus that is formed as explained above and the off-line processing for searching the restaurant by recognizing the speech that is inputted with reference to the created dictionaries are omitted because they are the same as the operations in the first embodiment.

With the above-mentioned structure, creating recognition dictionaries with reference to the user use information and the speech recognition history makes it possible to recognize words that are not included in the latest restaurant information as recognition words, recognize a speech recognition error and the presence/absence of the search data in the case where a restaurant is searched, and realize a user-friendly speech interface.

Also, as the recognition dictionaries are created by assigning weights to the registered words so as to assign an "item weight coefficient" and a "history weight coefficient" and the like to each of them, it becomes possible to improve the speech recognition rate.

Further, as a plurality of recognition dictionaries are created and one of the recognition dictionaries is selected to be used by a user and accepted, a user who thinks that the recognition rate of a speech recognition unit 109 is low can select the optimum dictionary from a plurality of dictionaries, which makes it possible to improve the recognition rate and realize a user-friendly interface.

In this embodiment, a weight is assigned to each "history weight coefficient" depending on whether the word is stored in the recognition word storage unit 105 as a past recognition word or not, but it may be changed depending on recognition times, listening times, use time and the like.

Also, a restaurant is supposed to be searched without considering whether the restaurant has not been used yet or whether the restaurant has already been used, the present invention is not limited to this. For example, in the case where a restaurant is searched depending on whether the user has not been used the restaurant yet or whether the user has already been used the restaurant, it is possible to use a different "item weight coefficient" depending on whether the former case is employed or the latter case is employed.

INDUSTRIAL APPLICABILITY

As stated above, a speech recognition dictionary creation apparatus and an information search apparatus concerning the present invention can create a recognition dictionary whose speech recognition rate has been improved, it is usable searching pieces of speech signal information using, for example, an information search apparatus such as a program guidance apparatus, a music guidance apparatus, a car navigation system and the like.

What is claimed is:

1. A speech recognition dictionary creation apparatus for creating and storing recognition dictionaries for speech recognition, comprising:

a dictionary creating unit operable to create a plurality of recognition dictionaries with different contents depending on presence/absence of user experience:

an action history word obtaining unit operable to obtain an action history word recognized based on an action of a user;

an action history word storage unit operable to store the obtained action history word;

a fixed word storage unit operable to store fixed words set previously;

a word extracting unit operable to extract new recognition words recognized from inputted data, wherein the dictionary creating unit creates one of the plurality of recognition dictionaries by selecting new registration words from the new recognition words, the fixed words and the action history word, registering the new registration words in the recognition dictionary and adding, to the new registration words, information indicating pronunciations and parts of speech of the new registration words.

2. The speech recognition dictionary creation apparatus according to claim 1, wherein the dictionary creating unit creates the plurality of recognition dictionaries by registering words in the recognition dictionaries based on attributes of the words.

3. The speech recognition dictionary creation apparatus according to claim 1,
wherein the presence/absence of user experience is related to presence/absence of viewing, and
the dictionary creating unit creates the plurality of recognition dictionaries based on the presence/absence of the viewing.

4. The speech recognition dictionary creation apparatus according to claim 1,
wherein the presence/absence of user experience is related to presence/absence of using, and
the dictionary creating unit creates the plurality of recognition dictionaries based on the presence/absence of the using.

5. The speech recognition dictionary creation apparatus according to claim 1,
wherein the presence/absence of user experience is related to presence/absence of visiting, and
the dictionary creating unit creates the plurality of recognition dictionaries based on the presence/absence of the visiting.

6. The speech recognition dictionary creation apparatus according to claim 1, further comprising:
a recognition word obtaining unit operable to obtain a past recognition word recognized by speech recognition; and
a past recognition word storage unit operable to store the past recognition word,
wherein the dictionary creating unit creates one of the plurality of recognition dictionaries by selecting new registration words from the new recognition words, the fixed words, the action history word and the past recognition word, registering the new registration words in the recognition dictionary and adding, to the new registration words, information indicating pronunciations and parts of speech of the new registration words.

7. The speech recognition dictionary creation apparatus according to claim 6,
wherein the dictionary creating unit creates the recognition dictionary by assigning weights to each of the new registration words based on whether or not the words are included in the past recognition word and adding, to the new registration words, information related to the assigned weights.

8. The speech recognition dictionary creation apparatus according to claim 6,
wherein the dictionary creating unit creates the recognition dictionary by assigning weights to each of the new registration words based on whether or not the words are included in the action history word and the words are included in the past recognition word and adding, to the new registration words, information related to the assigned weights.

9. The speech recognition dictionary creation apparatus according to claim 6,
wherein the inputted data is structured data,
the word extracting unit extracts attributes of the new recognition words together with the new recognition words, and
the dictionary creating unit creates the recognition dictionary by assigning weights to each of the new registration words based on the attributes of the new recognition words and adding, to the new registration words, information related to the assigned weights.

10. The speech recognition dictionary creation apparatus according to claim 6, further comprising:
a user information obtaining unit operable to obtain user recognition information for identifying the user,
wherein the dictionary creating unit creates the recognition dictionary for each piece of the user recognition information.

11. The speech recognition dictionary creation apparatus according to claim 6,
wherein the dictionary creating unit creates the recognition dictionary by assigning weights to each of the new registration words based on whether or not the words are included in the action history word and adding, to the new registration words, information related to the assigned weights.

12. The speech recognition dictionary creation apparatus according to claim 1,
wherein the dictionary creating unit determines, as the new registration words, following three kinds of words: the new recognition words; the fixed words; and a word that is not included either in the new recognition words or in the fixed words and that belongs both to the action history word and to the past recognition word.

13. The speech recognition dictionary creation apparatus according to claim 1,
wherein the dictionary creating unit creates the recognition dictionary by assigning weights to each of the new registration words based on whether or not the words are included in the action history word and adding, to the new registration words, information related to the assigned weights.

14. The speech recognition dictionary creation apparatus according to claim 1,
wherein the inputted data is structured data,
the word extracting unit extracts attributes of the new recognition words together with the new recognition words, and
the dictionary creating unit creates the recognition dictionary by assigning weights to each of the new registration words based on the attributes of the new recognition words and adding, to the new registration words, information related to the assigned weights.

15. The speech recognition dictionary creation apparatus according to claim 14,
wherein the dictionary creating unit creates one of the plurality of recognition dictionaries with different weights for the new registration words according to purposes, these weights being determined based on attributes of the new recognition words.

16. The speech recognition dictionary creation apparatus according to claim 14, further comprising:
an instruction accepting unit operable to accept an instruction from the user related to use purpose of the recognition dictionary,
wherein the dictionary creating unit creates one of the plurality of recognition dictionaries by assigning weights to each of the new registration words based on the attributes of the new recognition words in response to the instruction related to the use purpose that is accepted by the instruction accepting unit.

17. The speech recognition dictionary creation apparatus according to claim 14, further comprising:
a user information obtaining unit operable to obtain user recognition information for identifying a user,
wherein the dictionary creating unit creates the recognition dictionary by assigning weights to each of the new registration words for each piece of the user recognition information.

18. The speech recognition dictionary creation apparatus according to claim 1, further comprising:
a user information obtaining unit operable to obtain user recognition information for identifying the user,
wherein the dictionary creating unit creates the recognition dictionary for each piece of the user recognition information.

19. The speech recognition dictionary creation apparatus according to claim 1,
wherein the action history word obtaining unit records action date and time together with the action history word in the action history word storage unit,
the dictionary creating unit creates the recognition dictionary by further adding the action date and time to some of new registration words, these new registration words being selected from the action history word, and
the speech recognition dictionary creation apparatus further comprises
a word deleting unit operable to delete, from the recognition dictionary, the registration words which have been stored for a predetermined time period starting from the action date and time of the registration words.

20. The speech recognition dictionary creation apparatus according to claim 1, further comprising:
an EPG receiving unit operable to demultiplex, from a TV signal, the EPG data that is an electronic program guide,
wherein an action of the user is the action that the user has viewed a program,
the action history word obtaining unit obtains the action history word in response to the action that the user has viewed the program, and
the word extracting unit extracts, from the EPG data, the new recognition words for each category that is the attribute.

21. The speech recognition dictionary creation apparatus according to claim 20,
wherein the dictionary creating unit creates the recognition dictionary by assigning weights to each of the new registration words based on the categories of the EPG data and adding, to the new registration words, information related to the assigned weights.

22. The speech recognition dictionary creation apparatus according to claim 21,
wherein the dictionary creating unit creates a recognition dictionary for programs broadcasted in the future and another recognition dictionary for recorded programs, the recognition dictionary for programs broadcasted having higher weights for the registration words whose categories are "genre" and lower weights for the registration words whose categories are "title" and the recognition dictionary for recorded programs having higher weights for the registration words whose categories are "title" and lower weights for the registration words whose categories are "genre".

23. The speech recognition dictionary creation apparatus according to claim 1,
wherein the dictionary creating unit determines, as the new registration words, following three kinds of words: the new recognition words; the fixed words; and a word that is not included either in the new recognition words or in the fixed words and that belongs to the action history word.

24. An information search apparatus for creating and storing recognition dictionaries for speech recognition and searching information using a speech signal based on speech of a user, comprising:

a dictionary creating unit operable to create a plurality of recognition dictionaries depending with different contents on presence/absence of user experience;
a speech recognition unit operable to recognize a specific word from the speech signal by referring to one of the recognition dictionaries;
a data storage unit operable to store inputted data; and
a control unit operable to search the data for a word that is recognized by the speech recognition unit and output corresponding information
an action history word obtaining unit operable to obtain an action history word recognized based on an action of a user;
an action history word storage unit operable to store the obtained action history word;
a fixed word storage unit operable to store fixed words previously;
a word extracting unit operable to extract new recognition words recognized from inputted data; and
a dictionary storage unit operable to store the created recognition dictionary,
wherein the dictionary creating unit creates the recognition dictionary by selecting new registration words from the new recognition words, the fixed words and the action history word, registering the new registration words in the recognition dictionary and adding, to the new registration words, information indicating pronunciations and parts of speech of the new registration words.

25. The information search apparatus according to claim 24,
wherein the dictionary creating unit creates the plurality of recognition dictionaries based on attributes of words registered in the recognition dictionaries.

26. The information search apparatus according to claim 24,
wherein the presence/absence of the user experience is related to presence/absence of viewing, and
the dictionary creating unit creates the plurality of recognition dictionaries based on presence/absence of the viewing.

27. The information search apparatus according to claim 24,
wherein the presence/absence of the user experience is related to presence/absence of viewing, and
the dictionary creating unit creates the plurality of recognition dictionaries based on the presence/absence of the viewing.

28. The information search apparatus according to claim 24,
wherein the presence/absence of the user experience is related to presence/absence of visiting, and
the dictionary creating unit creates the plurality of the recognition dictionaries based on the presence/absence of the visiting.

29. The information search apparatus according to claim 24,
wherein the inputted data is structured data, the word extracting unit extracts attributes of the new recognition words together with the new recognition words, and
the dictionary creating unit creates the recognition dictionary by assigning weights to each of the new registration words based on the attributes of the new recognition words and adding, to the new registration words, information related to the assigned weights and creates the plurality of recognition dictionaries with different weights for the new registration words depending on purposes, these weights being determined based on attributes of the new recognition words, the information search apparatus further comprises:
a dictionary selection accepting unit operable to accept a dictionary selected by a user from the plurality of recognition dictionaries stored in the dictionary storage unit,
wherein the speech recognition unit recognizes a specific word obtained from a speech signal based on speech of a user by referring to the recognition dictionary accepted by the dictionary selection accepting unit.

30. The information search apparatus according to claim 24, further comprising:
an EPG receiving unit operable to demultiplex, from a TV signal, EPG data that is an electronic program guide,
wherein the action of the user is the action that the user has viewed a program,
the action history word obtaining unit obtains the action history word in response to the action that the user has viewed the program,
the word extracting unit extracts, from the EPG data, the new recognition word for each category that is the attribute,
the data storage unit stores the EPG data, and
the control unit outputs information related to corresponding program by searching the EPG data for the word recognized by the speech recognition unit.

31. A speech recognition dictionary creation apparatus for creating storing recognition dictionaries used for speech recognition, comprising:
an action history word obtaining unit operable to obtain an action history word recognized based on actions of a user;
an action history word storage unit operable to store the obtained action history word;
a fixed word storage unit operable to store fixed words set previously;
a word extracting unit operable to extract new recognition words recognized from inputted data;
a dictionary creating unit operable to create the recognition dictionary by selecting new registration words from the new recognition words, the fixed words and the action history word, registering the new registration words in the recognition dictionary and adding, to the new registration words, information indicating pronunciations and parts of speech of the new registration words; and
a dictionary storage unit operable to store the created recognition dictionary.

32. A speech recognition dictionary creation method for creating storing recognition dictionaries used for speech recognition comprising:
creating a plurality of recognition dictionaries with different contents depending on presence/absence of user experience;
obtaining an action history word recognized based on an action of a user;
storing the action history word;
storing fixed words set previously;
extracting new recognition words recognized from inputted data;
storing the plurality of created recognition dictionaries,
wherein one of the plurality of recognition dictionaries is created by selecting new registration words from the new recognition words, the fixed words and the action history word, registering the new registration words in the recognition dictionary and adding, to the new registering words, information indicating pronunciations and parts of speech of the new registration words.

33. An information search method for creating and storing recognition dictionaries used for speech recognition and searching information obtained from a speech signal based on speech of a user, comprising:
creating a plurality of recognition dictionaries with different contents depending on presence/absence of user experience;
recognizing a specific word from the speech signal by referring to the recognition dictionaries; and searching the inputted data for a word recognized by the speech recognition unit and outputting corresponding data;
obtaining an action history word recognized based on an action of a user;
storing the action history word;
storing fixed words set previously;
extracting new recognition words recognized from inputted data;
storing the plurality of created recognition dictionaries,
wherein one of the plurality of recognition dictionaries is created by selecting new registration words from the new recognition words, the fixed words and the action history word, registering the new registration words in the recognition dictionary and adding, to the new registration words, information indicating pronunciations and parts of speech of the new registration words.

34. "A program stored on a computer readable storage medium for causing" a computer to execute a process of creating and storing recognition dictionaries used for speech recognition, comprising:
creating a plurality of recognition dictionaries with different contents depending on presence/absence of user experience; and
obtaining an action history word recognized based on an action of a user;
storing the action history word;
storing fixed words set previously;
extracting new recognition words recognized from inputted data;
storing the plurality of created recognition dictionaries,
wherein one of the plurality of recognition dictionaries is created by selecting new registration words from the new recognition words, the fixed words and the action history word, registering the new registration words in the recognition dictionary and adding, to the new registration words, information indicating pronunciations and parts of speech of the new registration words.

35. "A program stored on a computer readable storage medium for causing" a computer to processes of creating and storing recognition dictionaries for speech recognition and searching information obtained from a speech signal based on speech of a user, comprising:
creating a plurality of recognition dictionaries with different contents depending on presence/absence of user experience;
storing the plurality of created recognition dictionaries;
recognizing a specific word from the speech signal by referring to one of the recognition dictionaries; and
searching the inputted data for words recognized by the speech recognition unit and outputting corresponding information
obtaining an action history word recognized based on an action of a user;
storing the action history word;
storing fixed words set previously;

extracting new recognition words recognized from inputted data;
storing the plurality of created recognition dictionaries,
wherein one of the plurality of recognition dictionaries is created by selecting new registration words from the new recognition words, the fixed words and the action history word, registering the new registration words in the recognition dictionary and adding, to the new registration words, information indicating pronunciations and parts of speech of the new registration words.

* * * * *